United States Patent [19]

Kohrogi et al.

[11] Patent Number: 4,721,979
[45] Date of Patent: Jan. 26, 1988

[54] DOCUMENT ILLUMINATING APPARATUS

[75] Inventors: Yutaka Kohrogi; Shuichi Ohtsuka, both of Kanagawa, Japan

[73] Assignee: Fuji Photo Film Co., Ltd., Kanagawa, Japan

[21] Appl. No.: 934,572

[22] Filed: Nov. 24, 1986

[30] Foreign Application Priority Data

Nov. 27, 1985 [JP] Japan .......................... 60-182376[U]

[51] Int. Cl.⁴ ............................................. G03G 15/04
[52] U.S. Cl. .......................................... 355/11; 355/67
[58] Field of Search ...................... 355/8, 11, 14 E, 45, 355/54, 64–67, 70

[56] References Cited

U.S. PATENT DOCUMENTS

| | | | |
|---|---|---|---|
| 3,539,258 | 11/1970 | Miles | 355/66 X |
| 3,669,538 | 6/1972 | Fowler | 355/67 |
| 3,850,523 | 11/1974 | Skavnak | 355/70 |
| 4,139,297 | 2/1979 | Hayashi et al. | 355/11 X |

*Primary Examiner*—Arthur T. Grimley
*Assistant Examiner*—J. Pendegrass
*Attorney, Agent, or Firm*—Sughrue, Mion, Zinn, Macpeak, and Seas

[57] ABSTRACT

A document illuminating apparatus includes a reflecting plate which reflects the light from a rod-shaped illuminating lamp before it is incident on a document disposed on a document table. The reflecting area of the reflecting plate is varied in the longitudinal direction thereof in such a manner that the side of the reflecting plate on which the distance between the document and an optical path changing mirror is relatively great has a larger reflecting area than that of the side of the reflecting plate on which said distance is relatively short. Accordingly, the illuminance of the reflected light from the document which is incident on the optical path changing mirror is made uniform along the longitudinal axis of the illuminating lamp.

18 Claims, 29 Drawing Figures

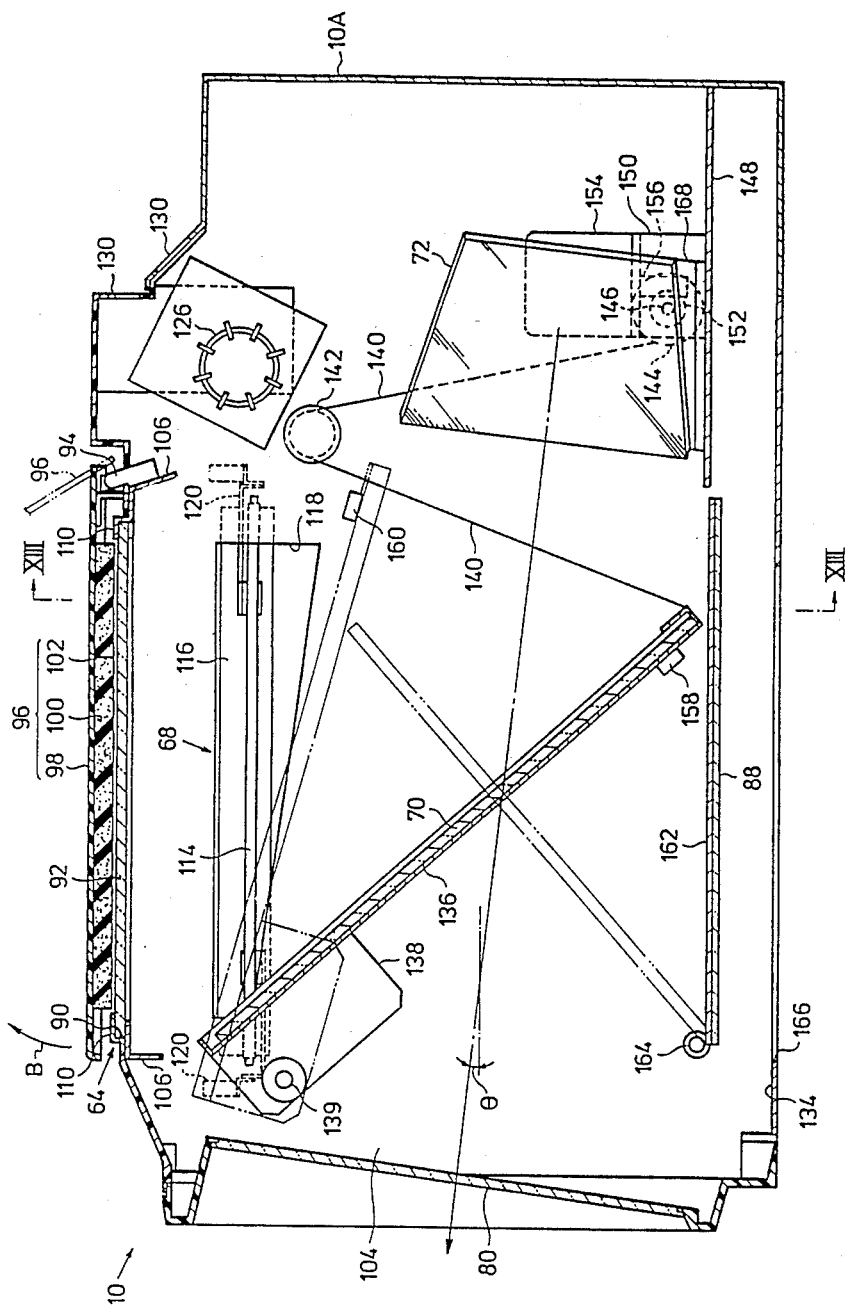

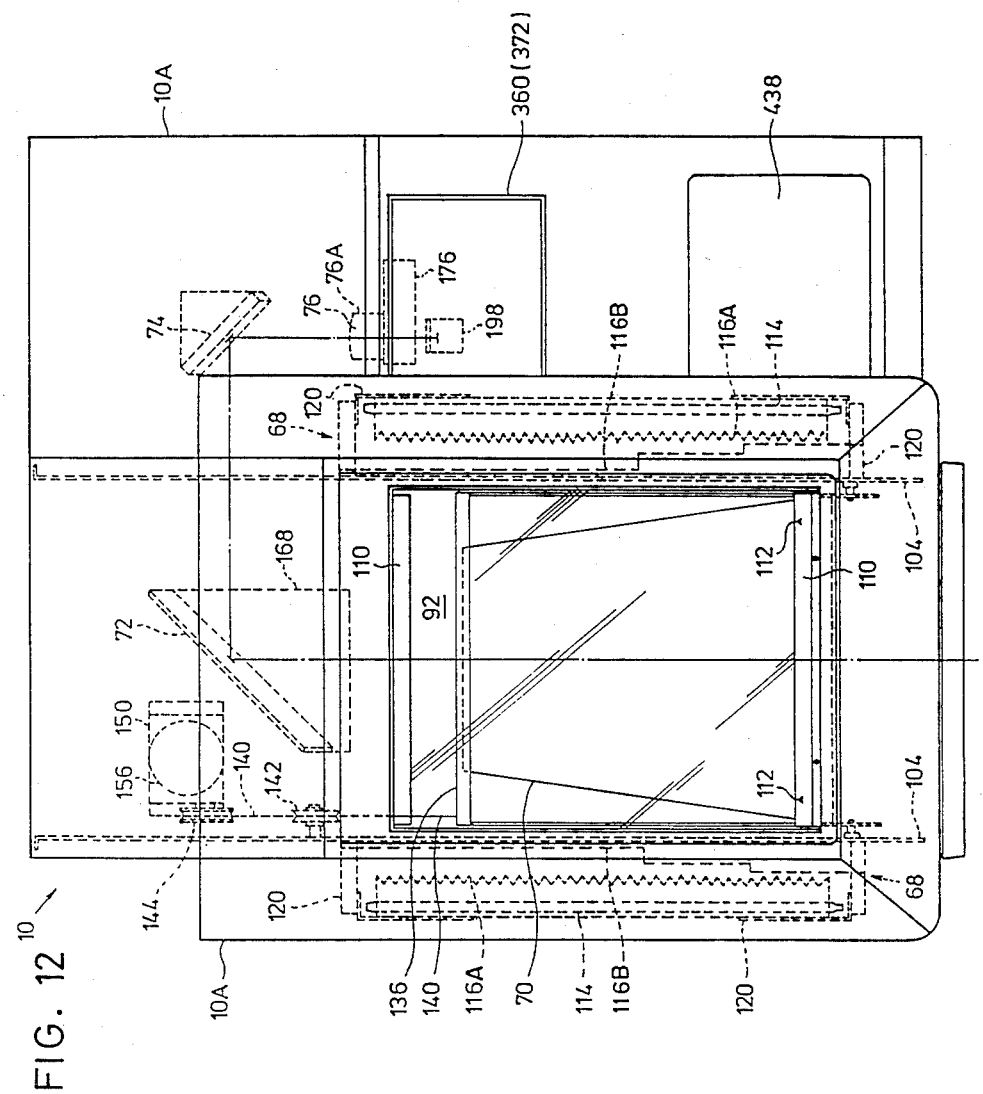

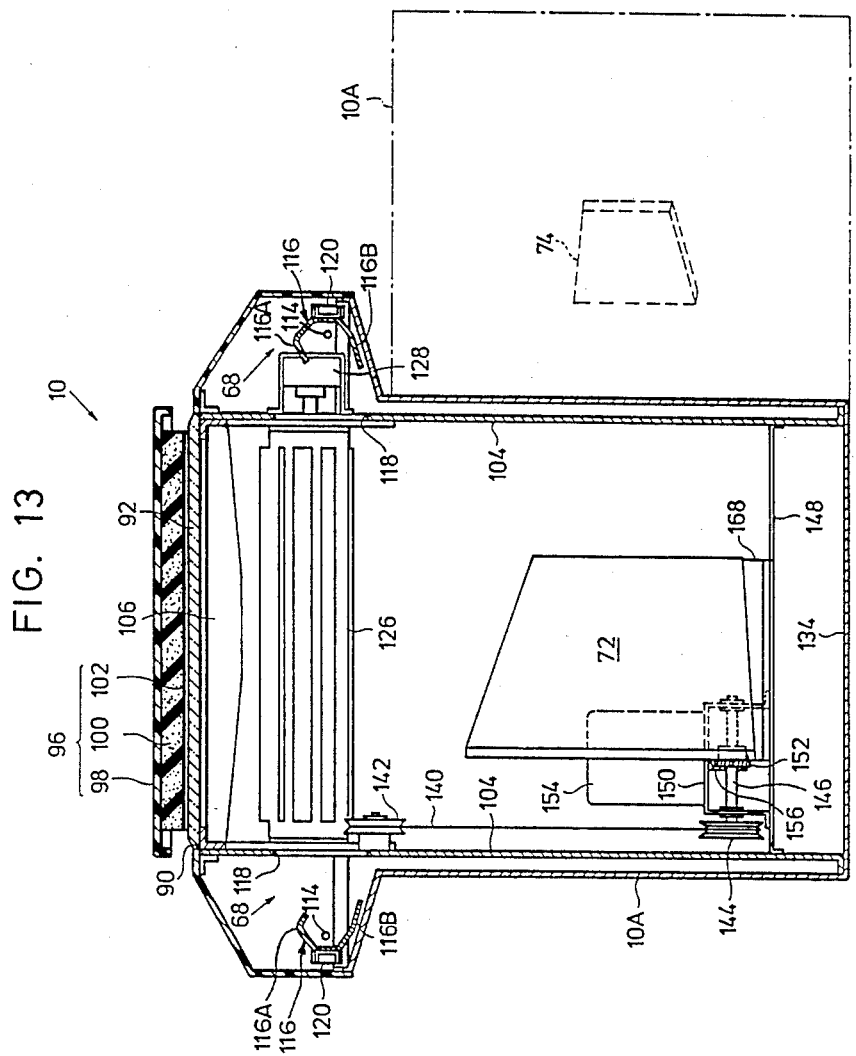

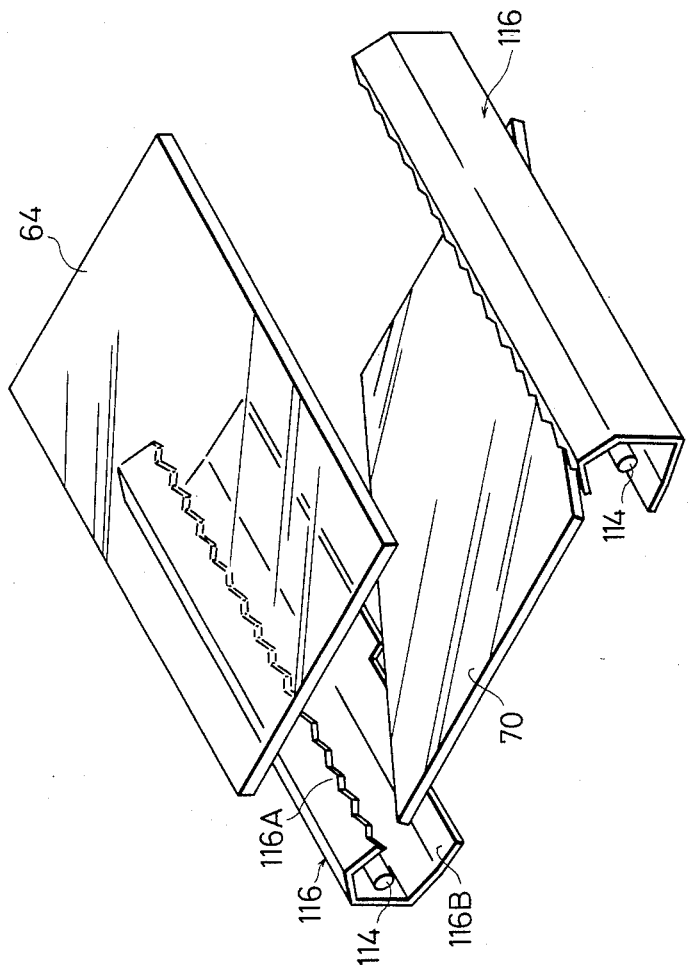

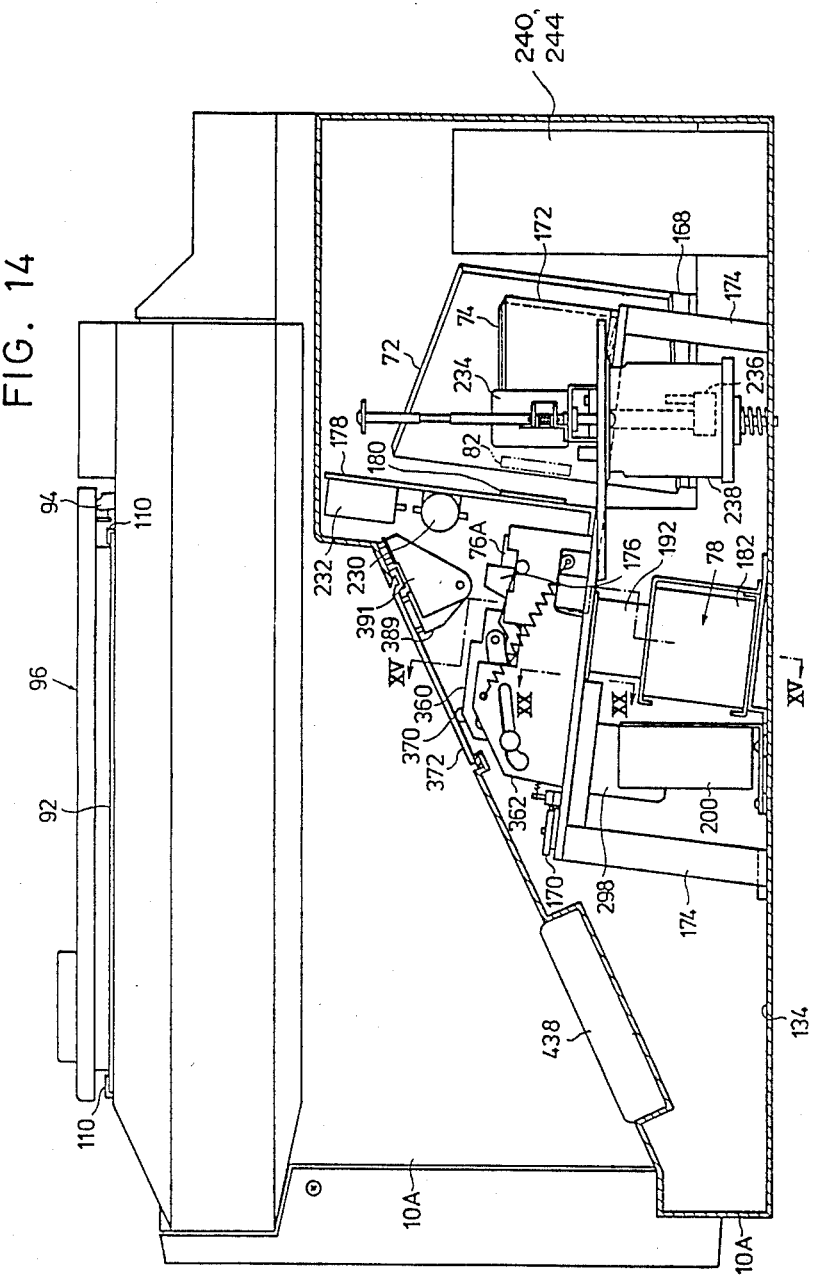

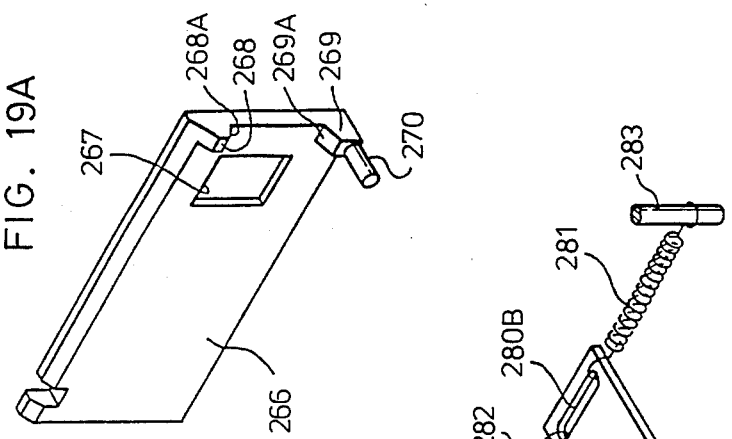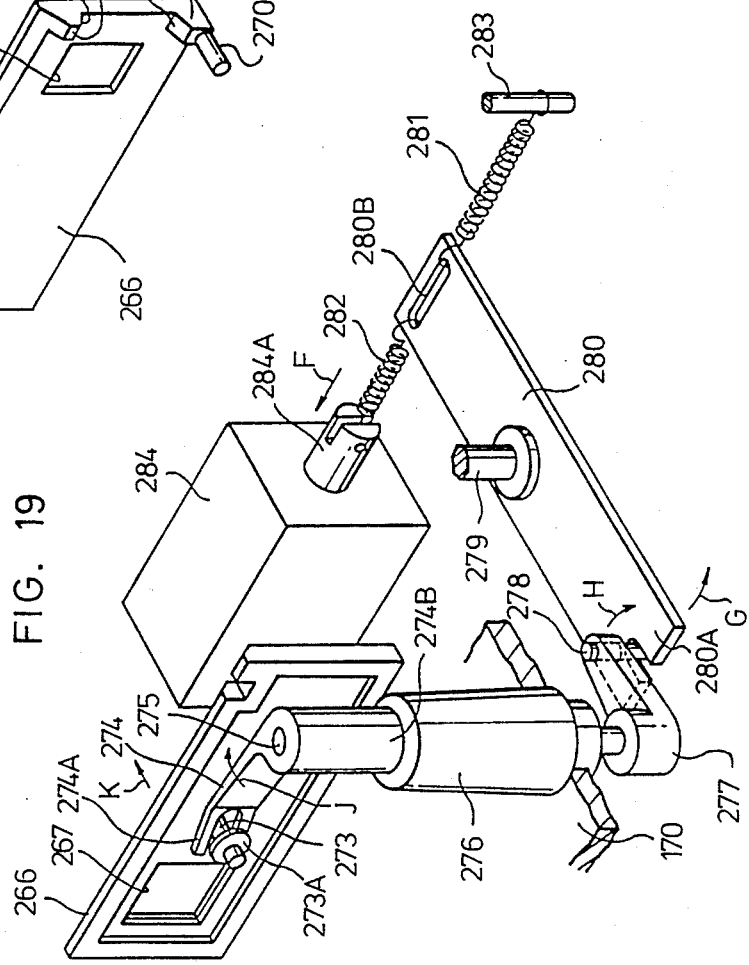

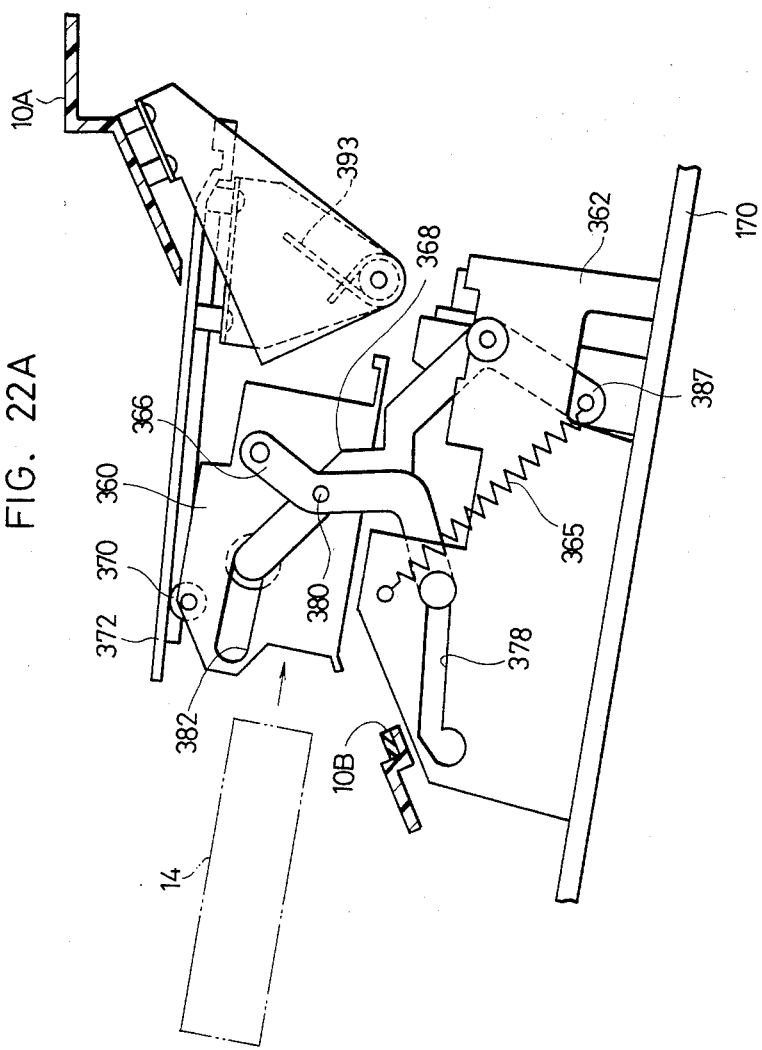

DOCUMENT ILLUMINATING APPARATUS

BACKGROUND OF THE INVENTION

1. Field of the Invention

The present invention relates to a document illuminating apparatus in which a document disposed on a document table is illuminated with an illuminating lamp, and the light reflected from the document is made incident on an optical path changing mirror so as to be led to a photosensitive section.

2. Description of the Related Art

Projecting and/or recording systems, which enable an image to be recorded on a predetermined frame of a photosensitive film and which also permit the recorded image to be projected or copied, have already been proposed in, e.g., U.S. Pat. Nos. 3,964,828, 3,972,610, and 4,600,291 and U.S. Ser. No. 632,222, now U.S. Pat. No. 4,619,519 and U.S. Ser. No. 920,336 filed Oct. 17, 1986.

This type of system is so designed that an optical path changing mirror faces diagonally a document disposed on a document table to lead the light reflected from the document to a photosensitive section in order to reduce the size of the system.

To illuminate the document and allow the light reflected therefrom to be incident on the optical path changing mirror, a linear illuminating lamp is disposed at a position intermediate between the document table and the mirror in such a manner that the lamp extends along one lateral side of these members. For example, such a case is disclosed in U.S. Pat. No. 3,697,176. As disclosed in the Patent, however, if the lamp is disposed at a position close to the document table, the illuminance is made uneven on the document. Accordingly, the illuminating lamp must be disposed at a position which is relatively remote from the document in order to illuminate it uniformly with direct rays of light emitted from the illuminating lamp alone. There is one example where the lamp is disposed at a position remote from the document table in U.S. Pat. No. 4,461,566, but this impedes minimization of the size of the system.

To overcome such disadvantage, an arrangement has been devised in which the light emitted from the illuminating lamp is divided into direct rays and reflected rays which have a lower illuminance than that of the direct rays, and these two types of light are applied to the document to make the luminous intensity uniform and allow the illuminating lamp to be disposed at a position relatively close to the document.

However, the above-described arrangement still involves unevenness in the intensity of illumination. Namely, since the optical path changing mirror faces the document diagonally, portions of the mirror on the respective sides thereof which are closer to and remote from the document have different luminous intensities. Such unevenness in the illuminance is particularly noticeable at portions of the document which are illuminated with that part of the light from the illuminating lamp which has been reflected for the purpose of lowering the illuminance.

SUMMARY OF THE INVENTION

In view of the above-described circumstances, it is a primary object of the present invention to provide a document illuminating apparatus wherein a linear illuminating lamp is disposed at a position intermediate between a document table on which a document is disposed and an optical path changing mirror disposed so as to face the document diagonally in such a manner that the lamp extends along one lateral side of these members, and a reflecting plate is disposed to reflect the light from the illuminating lamp before it is incident on the document, the apparatus being so designed that the light which is emitted from the illuminating lamp and reflected from the document can be made incident on the optical path changing mirror at a uniform illuminance.

To this end, the present invention provides a document illuminating apparatus wherein a document disposed on a document table is illuminated with an illuminating lamp, and the light reflected from the document is made incident on an optical path changing mirror to change the course of the reflected light, the mirror being disposed in such a manner as to face the document diagonally, the apparatus comprising: the illuminating lamp having the shape of a rod and disposed at a position intermediate between the document table and the optical path changing mirror in such a manner that the lamp extends along one lateral side of these members; and a reflecting plate disposed in such a manner as to extend in the longitudinal direction of the illuminating lamp to reflect the light from the lamp before it is incident on the document, the reflecting plate being varied in the reflecting area in the longitudinal direction of the illuminating lamp in such a manner that the side of the reflecting plate on which the distance between the document and the optical path changing mirror is relatively great has a larger reflecting area than that of the side of the reflecting plate on which said distance is relatively short.

In the document illuminating apparatus arranged as described above, the reflected light from the illuminating lamp which is incident on the document is varied in quantity in such a manner that the quantity of light which is incident on a portion of the document on the side thereof which is closer to the optical path changing mirror is made relatively small, so that the illuminance of the reflected light from the document which is incident on the mirror is made uniform in the longitudinal direction of the lamp.

BRIEF DESCRIPTION OF THE DRAWINGS

FIGS. 1 to 24 show in combination one embodiment of the present invention in which the invention is applied to a projecting and recording system, of which:

FIG. 1 is a perspective view showing the external appearance a projecting and recording system consisting of a combination of a projecting and recording system body and a copying machine;

FIG. 2 is a front view showing the external appearance of the projecting and recording system, the copying machine being shown by the imaginary line;

FIG. 3 is a perspective view showing the external appearance of a cassette which is loaded into the system in accordance with the embodiment of the present invention;

FIG. 4 is a perspective view showing the external appearance of the cassette shown in FIG. 3 as viewed from the reverse side thereof;

FIG. 5 is a perspective view of a tape and reels, which are accommodated in the cassette;

FIG. 6 is a detailed view of a part of an electrophotographic film;

FIG. 7 is a sectional view of the electrophotographic film taken along the line VII—VII in FIG. 6;

FIG. 8 is a schematic perspective view of a recording optical system in the projecting and recording system;

FIG. 9 is a schematic perspective view of a projecting optical system in the projecting and recording system;

FIG. 10 is a schematic perspective view of a copying optical system in the projecting and recording system;

FIG. 11 is a sectional view taken along the line XI—XI in FIG. 2, which shows the inner structure of the projecting and recording system body;

FIG. 12 is a plan view of the projecting and recording system with a document pressing plate of a document table removed, which corresponds to a sectional view taken along the line XII—XII in FIG. 2;

FIG. 13 is a sectional view taken along the line XIII—XIII in FIG. 11, which shows the inner structure of the projecting and recording system body;

FIG. 13A shows the relationship between an illuminating lamp, a reflecting plate and a document;

FIG. 13C is a perspective view showing a mutual relationship among a document table 64, illuminating lamps 114, reflecting plates 116 and a mirror 70;

FIG. 14 is a sectional view taken along the line XIV—XIV in FIG. 2, which shows the inner structure of the projecting and recording system;

FIG. 15 is a sectional view taken along the lines XV—XV in FIGS. 14 and 21, which shows the inner structure of the projecting and recording system;

FIG. 16 is a sectional view taken along the line XVI—XVI in FIG. 15, which shows the inner structure of the projecting and recording system;

FIG. 17 is a perspective view of a processing head for carrying out each of the steps of processing an electrophotographic film;

FIG. 18 is a sectional view of the processing head taken long a horizontal plane;

FIGS. 19 and 19A are perspective views showing a pressing plate in detail;

FIG. 20 is a sectional view taken along the line XX—XX in FIG. 14, which shows the inner structure of the projecting and recording system body;

FIG. 21 is a sectional view taken along the line XXI—XXI in FIG. 15, which shows the inner structure of the projecting and recording system body;

FIG. 22 is a sectional view taken along the line XXII—XXII in FIG. 15, which shows the inner structure of the projecting and recording system body;

FIG. 22A illustrates the arrangement shown in FIG. 22 in an operative state, which corresponds to a sectional view taken along the line XXII—XXII in FIG. 15;

FIG. 23 is a sectional view taken along the line XXIII—XXIII in FIG. 2, which schematically shows the inner structure of the copying machine; and FIG. 24 is a perspective view of an exposing table in the copying machine.

DESCRIPTION OF THE PREFERRED EMBODIMENT

FIGS. 1 to 24 show in combination one embodiment of the present invention in which a document illuminating apparatus according to the invention is applied to a projecting and recording system.

The document illuminating apparatus according to the present invention can be applied to all apparatuses where an image is formed on a microfilm and/or projected and an electrophotographic film to which the document illuminating apparatus is applied includes all microfilm on which the image is recorded.

Figure 1:
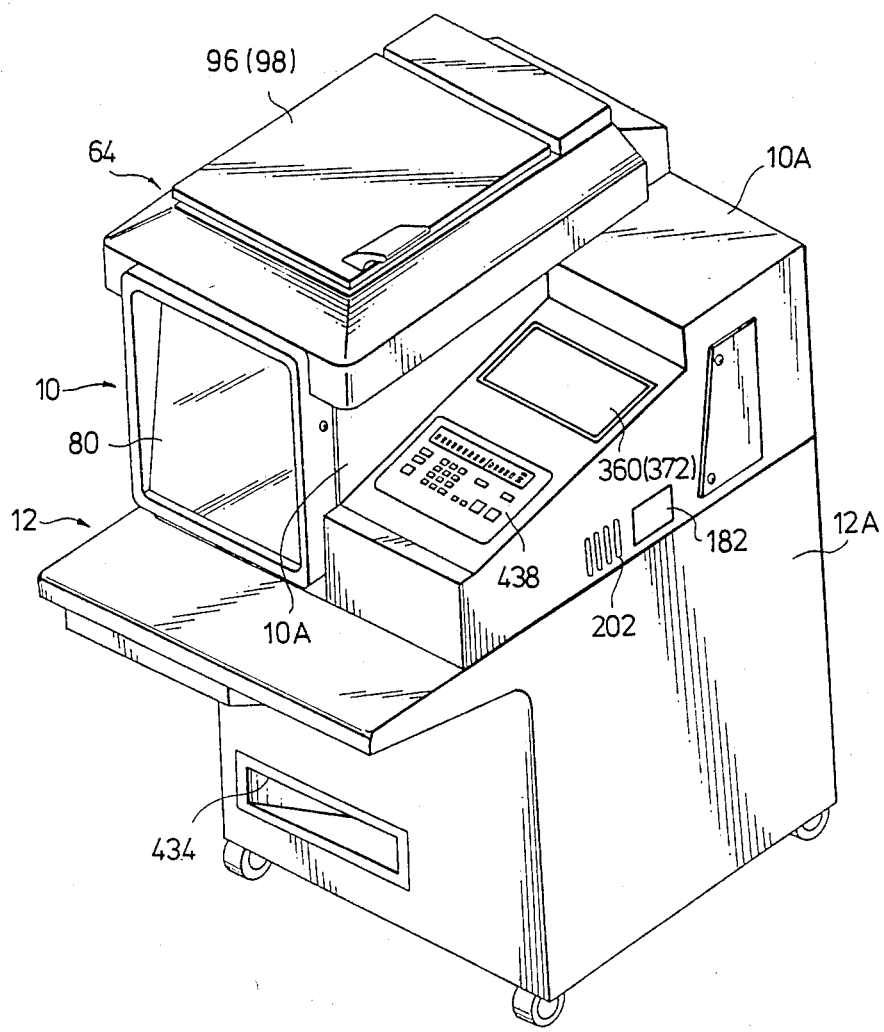
Figure 2:
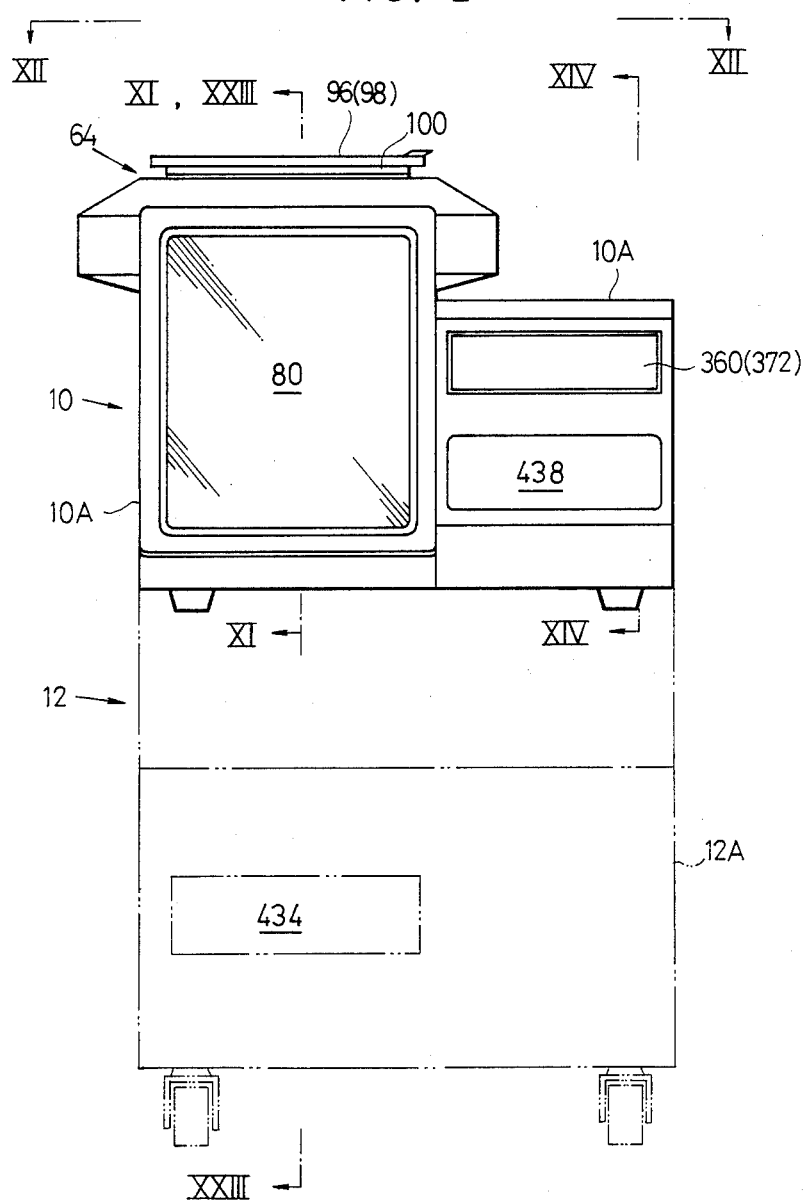

FIG. 1 is a perspective view showing the external appearance of the whole of the projecting and recording system, and FIG. 2 is a front view of the system shown in FIG. 1. The projecting and recording system shown in FIG. 1 has an integral structure which consists of a projecting and recording system body 10 and a copying machine 12 having a housing 12A serving also as a table for mounting the body 10. It should be noted that the projecting and recording system body 10 may be used alone as shown by the solid line in FIG. 2.

The embodiment of the present invention will be described hereinunder in detail.

[Cassette]

Figure 3:
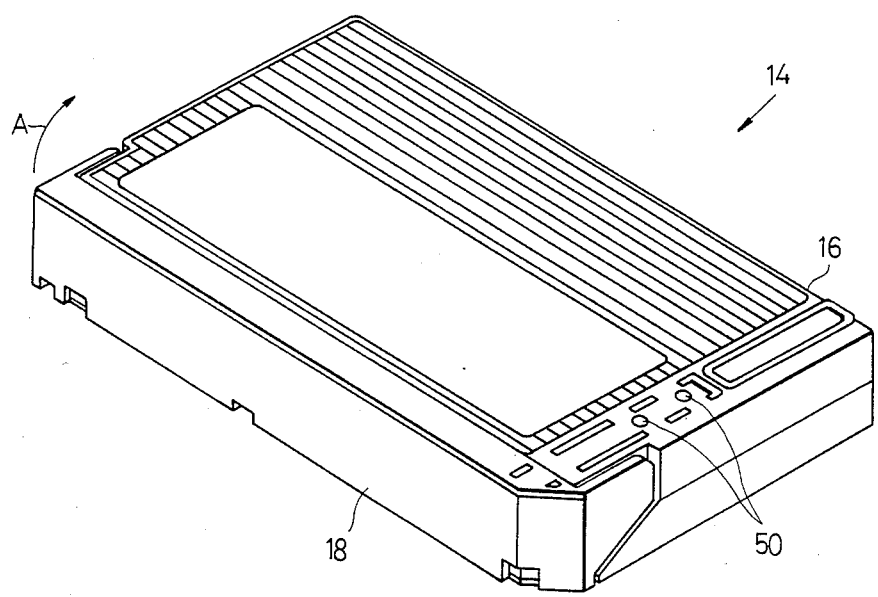
Figure 4:
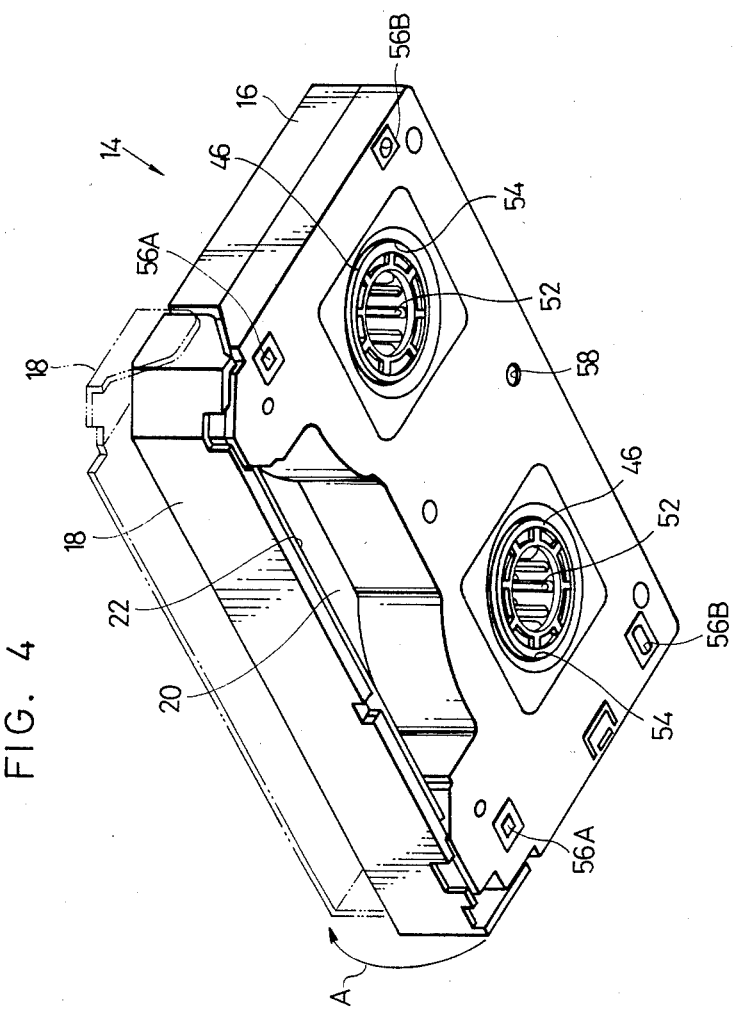

FIGS. 3 and 4 show a cassette which is loaded in the projecting and recording system. FIG. 3 is a perspective view showing the external appearance of the cassette as viewed from the upper side thereof, and FIG. 4 is a perspective view of the cassette as viewed from the reverse side thereof.

A cassette 14 has a guard panel 18 disposed on the front side thereof. The guard panel 18 is pivotally supported at both lateral ends thereof by a cassette casing 16 so that the panel 18 is able to pivot in the direction of the arrow A. As shown in FIG. 4, the cassette casing 16 has a recess 20 which opens in both the front and reverse sides. The intermediate portion of a tape 22 which is accommodated inside the cassette casing 16 extends through the recess 20 in the lateral direction of the cassette casing 16. A portion of the tape 22 which is positioned in the recess 20 is exposed at the front side of the cassette casing 16 when the guard panel 18 is pivoted in the direction of the arrow A.

Figure 5:
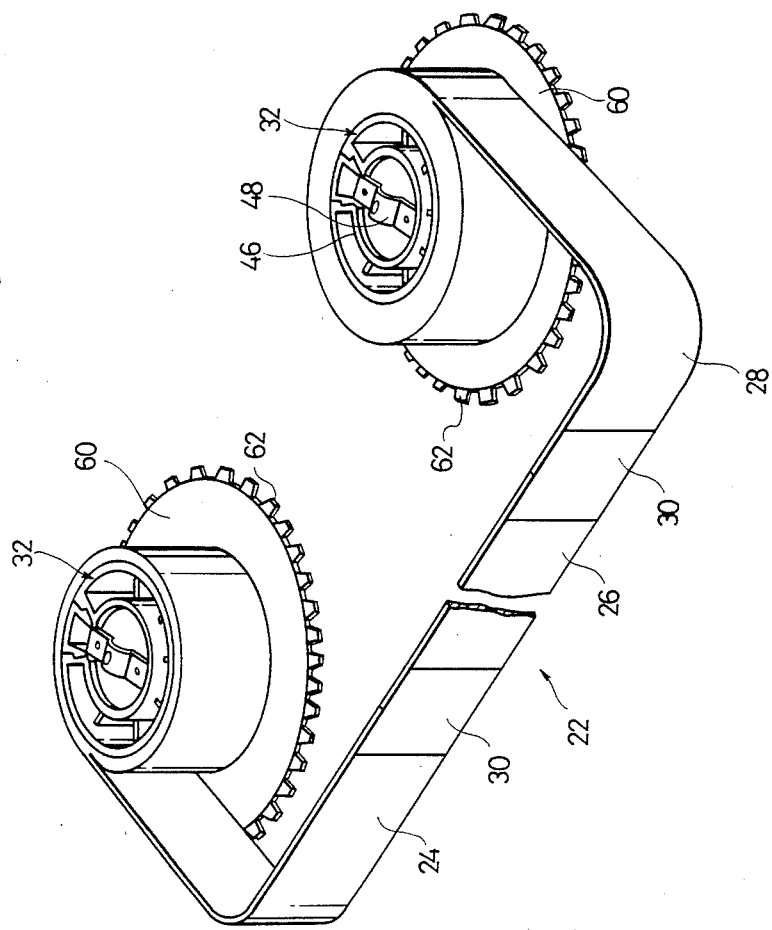

Referring to FIG. 5, the tape 22 consists of a leader tape 24, a magnetic tape 26 and an electrophotographic film 28, which are spliced together along the longitudinal direction of the tape 22 by pieces of splicing tape 30. Both end portions of the tape 22 are respectively retained by a pair of reels 32 which are accommodated in the cassette casing 16 so that the tape 22 is wound on the reels 32.

Figure 6:
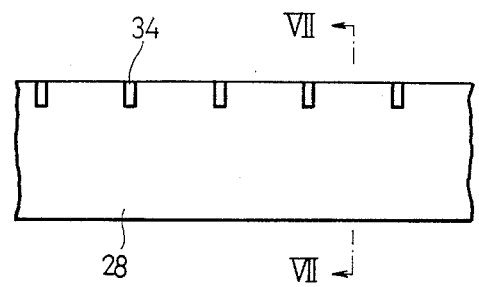
Figure 7:
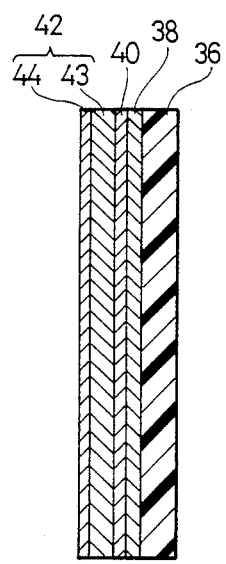

As shown in FIG. 6, the electrophotographic film 28 is printed with blip marks 34 along the upper edge thereof at predetermined regular spacings in the longitudinal direction of the film 28 (no blip marks 34 are shown in FIG. 5). As will be clear from FIG. 7 (a sectional view taken along the line VII—VII in FIG. 6), the electrophotographic film 28 includes a transparent base 36 (with a thickness of about 75 $\mu$m) made of, e.g., polyethylene, and a thin transparent electrically conductive layer 38 formed on the base 36 by evaporation or other similar means. Further, a photosensitive layer 42 (with a thickness of about 9 $\mu$m), which becomes electrically conductive when it receives light, is formed on the electrically conductive layer 38 through an intermediate layer 40. The photosensitive layer 42 consists of a photoconductive layer 43 (with a thickness of about 8 $\mu$m) and a protective layer 44 (with a thickness of about 1 $\mu$m) for protecting the layer 43. The electrophotographic film 28 is disposed in such a manner that, when the film 28 is positioned in the recess 20 defined in the cassette casing 16, the side of the film 28 which is closer to the photoconductive layer 43 faces the guard panel 18. It should be noted that the electrophotographic film shown in FIG. 7 is not necessarily limitative, and any known type of electrophotographic film may be employed.

As shown in FIG. 5, a contact piece 48 is secured to a boss portion 46 of each reel 32. The contact piece 48 provides electrical connection between the transparent electrically conductive layer 38 of the electrophotographic film 28 and external contacts 50 (see FIG. 3) exposed at the upper surface of the cassette casing 16. As shown in FIG. 4, each boss portion 46 has the shape of a tube the bottom of which is open, and projecting walls 52 are formed on the inner peripheral wall of the bass portion 46 at equal spacings. The boss portions 46 are respectively positioned in through-holes 54 provided in the bottom of the cassette casing 16 in such a manner that the boss portions 46 are exposed to the outside of the cassette casing 16.

The bottom of the cassette casing 16 is, as shown in FIG. 4, provided with a pair of positioning projections 56A which come in contact with positioning pins, respectively, a pair of positioning holes 56B each closed at one end thereof which receive positioning pins, respectively, and a through-hole 58 for receiving a brake releasing pin. When the pin is inserted into the through-hole 58, a brake mechanism is released which engages with rectangular projections 62 formed on the outer periphery of a flange portio 60 of each of the reels 32 (see FIG. 5) to prevent rotation of the reels 32.

[Optical Systems in Projecting and Recording System]

Figure 8:
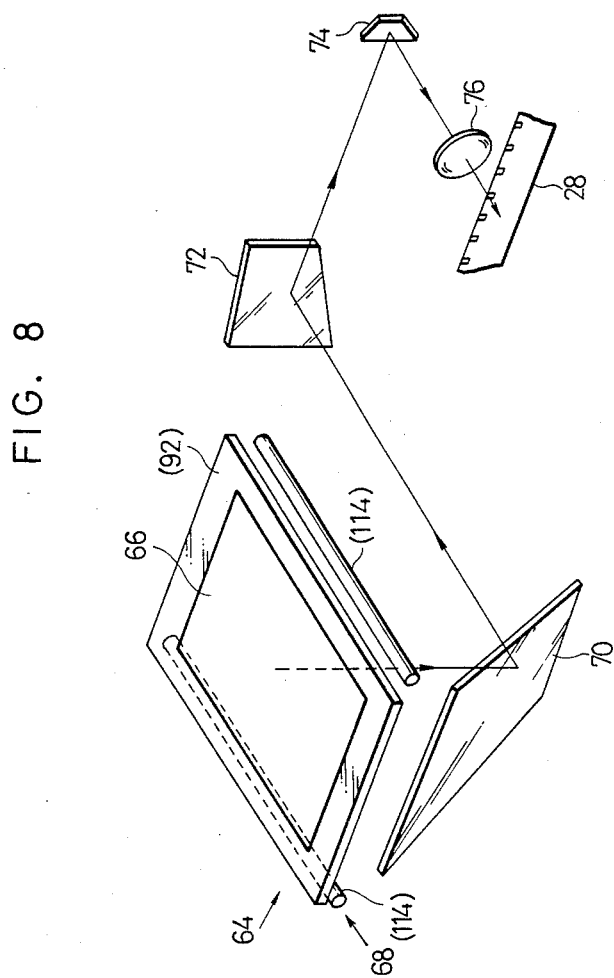
Figure 9:
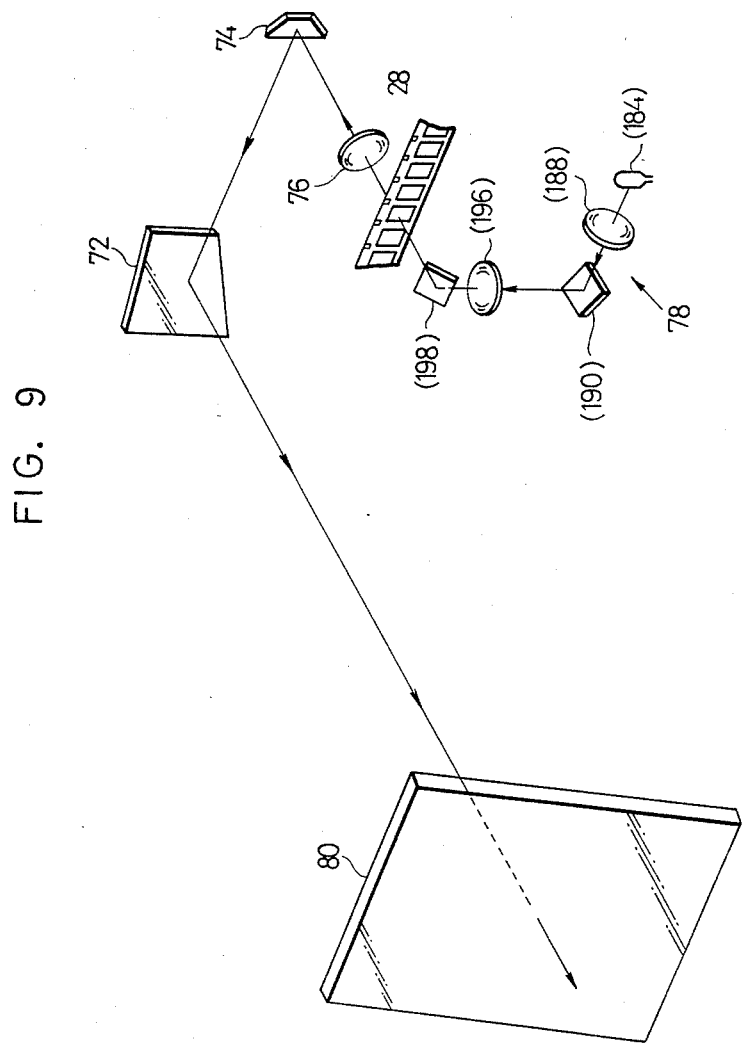
Figure 10:
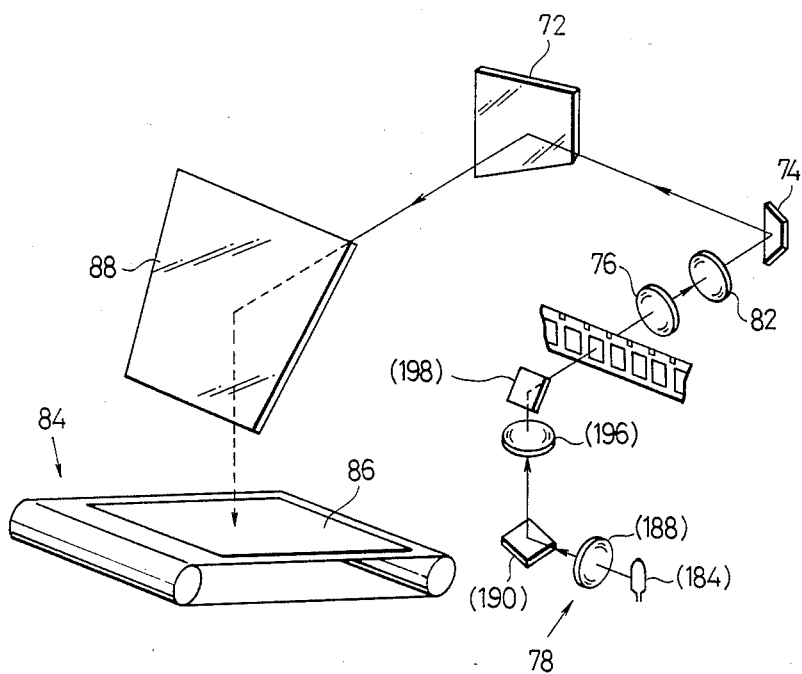

FIGS. 8 to 10 schematically show various optical systems in the projecting and recording system, respectively.

Referring first to FIG. 8, a recording optical system includes a document illuminating apparatus 60 according to the present invention which illuminates a document 66 as a subject which is set on a document table 64, a third mirror 70 on which the light reflected from the document 66 is made incident, a second mirror 72 on which the light reflected from the third mirror 70 is made incident, a first mirror 74 on which the light reflected from the second mirror 72 is made incident, and a main lens 76 for focusing the light reflected from the first mirror 74 on the surface of the electrophotographic film 28.

Referring next to FIG. 9, a projecting optical system includes a projecting light source section 78 for illuminating the electrophotographic film 28, the main lens 76 for focusing the light passing through the film 28 on the first mirror 74, the second mirror 72 on which the light reflected from the first mirror 74 is made incident, and a screen 80 on which the light reflected from the second mirror 72 is projected.

As shown in FIG. 10, a copying optical system includes, the projecting light source section 78, the main lens 76, the first mirror 74, the second mirror 72, a conversion lens 82 disposed between the main lens 76 and the first mirror 74 to slightly reduce the optical image formed on the first mirror 74, and a copy mirror 88 adapted to reflect the light reflected from the second mirror 72 toward a sheet of copying paper 86 set on an exposing table 84 disposed in the copying machine 12 (see FIGS. 1 and 2).

The main lens 76 and the first and second mirrors 74, 72 are mutually used for the above-described three optical systems, and they are fixedly disposed within the housing 10A of the projecting and recording system body 10 (see FIGS. 1 and 2). The third mirror 70, the copy mirror 88, the conversion lens 82 and the screen 80 are also disposed within the projecting and recording system body 10 and selectively used. The third mirror 70, the copy mirror 88 and the conversion lens 82 are movably disposed within the housing 10A so that they are prevented from interfering with any other optical systems, whereas the screen 80 is fixedly disposed at the front side of the housing 10A since it does not interfere with any other optical systems.

[Document Table]

As shown in FIGS. 1 and 2, the document table 64 is disposed on the left upper side of the projecting and recording system body 10. Referring to FIG. 11 (a sectional view taken along the line XI—XI in FIG. 2), the document table 64 includes a transparent glass plate 92 disposed in such a manner as to cover a relatively large upper opening 90 provided in the upper side of the housing 10A of the projecting and recording system body 10, and a document pressing plate 96 which is disposed in such a manner as to cover the upper surface of the glass plate 92 and which is able to be opened in the direction of the arrow B by means of an opening and closing member 94. The document pressing plate 96 consists of a cover 98, a cushioning member 100 made of a sponge material and bonded to the cover 98, and a white pressing sheet 102 bonded to the cushioning member 100.

The glass plate 92 is supported at the periphery of the reverse side thereof by a mounting bracket 106 which is rigidly secured to side frames 104 provided on a base frame 134 in such a manner as to extend upward in opposing relation to each other. The inner surface of the bracket 106 is painted in white. It should be noted that the opening and closing member 94 is also rigidly secured to the mounting bracket 106.

As shown in FIG. 12 (a sectional view taken along the line XII—XII in FIG. 2, showing the system with the document pressing plate 96 removed), thin-walled frame plates 110 for clamping said glass plate 92 together with the mounting bracket 106 are disposed at the front and rear end portions, respectively, on the upper side of the glass plate 92. Document positioning marks 112 are provided on the frame plate 110 positioned at the front end. The inner side surfaces of the frame plates 110 are also painted in white.

Since the respective inner sides of the mounting bracket 106 and the frame plates 110 are painted in white, when the document 66 set on the document table 64 (see FIG. 8) is recorded on the electrophotographic film 28, the light reflected from the portions painted in white is applied to the peripheral portion of a frame of the film 28 which is subjected to recording, and the peripheral portion is thereby exposed. In consequence, no black frame is produced when the frame formed with an image is developed.

[Document Illuminating Apparatus]

Figure 13:
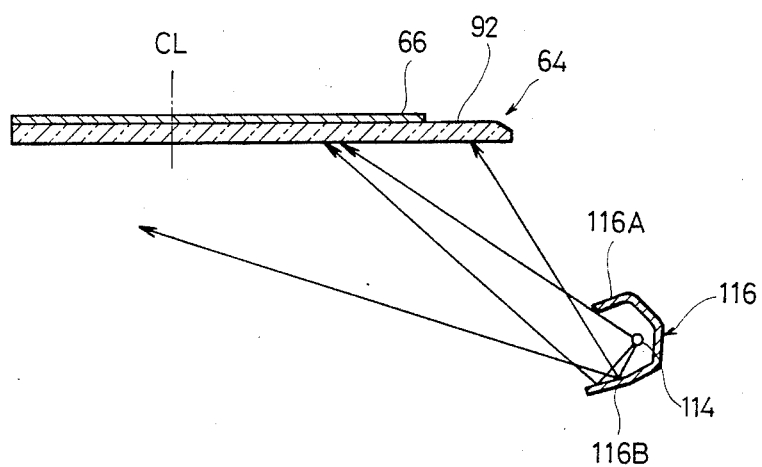

Referring to FIGS. 11, 12 and 13 (a sectional view taken along the line XIII—XIII in FIG. 11), the document illuminating apparatus 68 according to the present invention is disposed below the document table 64. The document illuminating apparatus 68 includes illuminating lamps 114, reflecting plates 116 for reflecting the light emitted from the lamps 114, and aperture masks 118 which are respectively formed in side frames 104 in order to allow the light from the lamps 114 to illuminate the document 66 (see FIG. 8) uniformly.

The illuminating lamps 114 have a tubular configuration, that is rod shaped, and are disposed below and on both sides, respectively, of the glass plate 92 in such a manner that the lamps 114 extend parallel with the glass plate 92 in the longitudinal direction thereof. Both end portions of each illuminating lamp 114 are respectively supported by brackets 120 which are rigidly secured to the corresponding side frame 104. Each reflecting plate 116 is also supported by the corresponding brackets 120 and extends along the longitudinal direction of the glass plate 92 in such a manner as to cover the upper and lower and outer side portions of the corresponding lamp 114 as shown in FIG. 13. The light emitted from each illuminating lamp 114 is applied to the document 66 set on the upper surface of the glass plate 92 through the opening in the associated aperture mask 118.

Figure 13B:
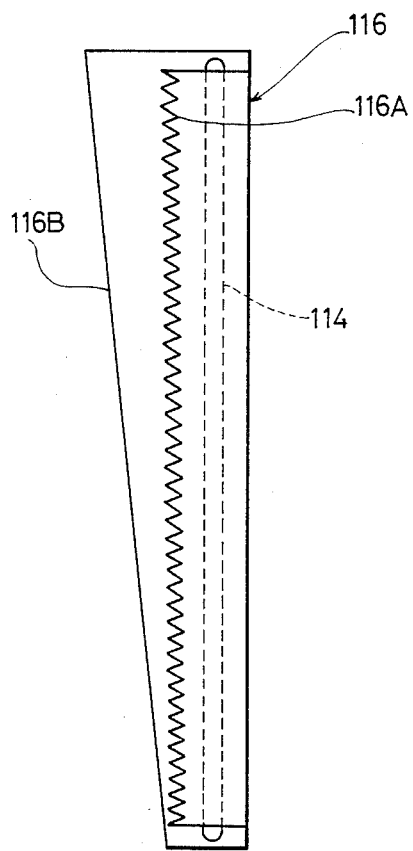
FIG. 13B shows another example of the reflecting plate.

As shown in FIG. 13A, a portion 116A of each reflecting plate 116 which is disposed above the corresponding illuminating lamp 114 serves as a shielding plate so that no direct rays are applied to an end portion of the document 66 which is closer to the lamp 114. A portion 116B of the reflecting plate 116 which is positioned below the illuminating lamp 114 in such a manner as to define a reflecting portion is adapted to reflect the light from the lamp 114 so as to be incident on the end portion of the document 66. Since the third mirror 70 which defines an optical path changing mirror faces the document table 64 diagonally as shown in FIG. 11, the portion 116B is, as shown in FIG. 12, enlarged stepwise in width so as to increase the reflecting area from the lower side toward the upper side as viewed in FIG. 12 for the purpose of preventing lowering in the illuminance of the light reflected from the document 66 and made incident on the lower end portion (which is relatively remote from the document 66) of the third mirror 70. The configuration of the portion 116B is not necessarily limited to a step-like configuration, and the portion 116B may, of course, be tapered as shown in FIG. 13B.

In addition, the edge of the portion 116A of each reflecting plate 116 which is positioned above the corresponding illuminating lamp 114 is serrated as shown in FIG. 12 in order to prevent any dark region from being produced at a boundary between the reflected and direct rays of light emitted from the lamp 114 which was made incident on the document 66. The mutual relationship among the document table 64, the illuminating lamps 114, the reflecting plates 116 and the third mirror 70 is clearly shown in FIG. 13C.

Similarly, each aperture mask 118 is so designed to prevent nonuniform illumination of the document 66. More specifically, the lower edge of the opening in the mask 118 is slanted downward from the left-hand side toward the right-hand side as viewed in FIG. 11 so that the right- and left-hand portions (as viewed in FIG. 11) of the aperture mask 118 have different heights.

To prevent lowering in illuminance at the central portion of the document 66 located at a position which is remote from both the illuminating lamps 114 (the central position between the right and left illuminating lamps 114 as viewed in FIG. 13), the central portion of the mounting bracket 106 is, as shown in FIG. 13, extended downward more than the other portions thereof so that the bracket 106 functions as an auxiliary reflecting plate.

As shown in FIGS. 11 and 13, a cooling fan 126 is disposed inside the housing 10A of the projecting and recording system body 10 in such a manner that both end portions of the fan 126 are respectively supported by the side frames 104 disposed in opposing relation to each other. The cooling fan 126 is provided for the purpose of cooling the illuminating lamps 114 which have heated up and the atmosphere inside the housing 10A which has been raised in temperature by the lamps 114. The cooling fan 126 is driven by a motor 128 secured to the reverse side of one side frame 104 as shown in FIG. 13 so as to discharge the warm air inside the housing 10A through a louver 130 shown in FIG. 11.

[Screen Mirror Lens]

As shown in FIGS. 1 and 2, the screen 80 is disposed at the left front side of the projecting and recording system body 10 in such a manner that a line perpendicular to the surface of the screen 80 is inclined at an angle $\theta$ with respect to a base frame 134 of the body 10 as shown in FIG. 11. The screen 80 is of the rear projecting type in which an image which is projected from the rear side of the screen 80 is viewed as transmitted light from the front side, i.e., the outside, of the screen 80.

Referring to FIG. 12, the third mirror 70 is defined by a trapezoidal plane mirror, and fixed to a mirror frame 13 as shown in FIGS. 11 and 12. Brackets 138 are rigidly secured to both lateral edges, respectively, of the left-hand end portion (as viewed in FIG. 11) of the mirror frame 136. The brakets 138 are pivotally supported through pins 139 by the opposing side frames 104, respectively. One end of a wire 140 is retained by the right-hand end (as viewed in FIG. 11) of the mirror frame 136, i.e., the free end thereof. The intermediate portion of the wire 140 is passed over a pulley 142 which is rotatably supported by one side frame 104, and the other end of the wire 140 is retained by a take-up pulley 144.

The take-up pulley 144 is, as shown in FIG. 13, rigidly secured to one end portion of a shaft 146. The shaft 146 is rotatably supported by a bracket 150 with a substantially hat-shaped cross-section which is rigidly secured to a first subbase frame 148. A worm wheel 152 is rigidly secured to the intermediate portion of the shaft 146. The worm wheel 152 is meshed with a worm 156 which is rigidly secured to the shaft of a motor 154 mounted on the bracket 150. It should be noted that the first subbase frame 148 is rigidly secured at both ends thereof to the opposing side frames 104, respectively, the frame 148 being positioned above the base frame 134.

The third mirror 70 is pivoted together with the mirror frame 136 which is pivoted about the pins 139 in response to the movement of the wire 140 which is wound up and unwound from the take-up pulley 144, between the lower-limit position shown by the solid line in FIG. 11 and the upper-limit position shown by the chain line in the same figure. Lower and upper limit switches 158 and 160 are secured to one side frame 104, the switches 158 and 160 being adapted to come in contact with the mirror frame 136 at the lower and upper limit positions, respectively, of the third mirror 70.

As shown in FIG. 11, the copy mirror 88 is disposed below the third mirror 70. The copy mirror 88 is defined by a trapezoidal plane mirror in a manner similar to that of the third mirror 70, but the left-hand edge (as viewed in FIG. 11) of the copy mirror 88 defines the shorter side of the trapezoidal configuration in a manner contrary to that of the third mirror 70 (see FIGS. 8 and 10 in comparison with each other). The copy mirror 88 is rigidly secured to a mirror frame 162. Both lateral edges of the left-hand end portion (as viewed in FIG. 11) of the mirror frame 162 are pivotally supported by the opposing side frames 104 through pins 164, respectively.

The copy mirror 88 is interlocked with a drive system (not shown) of the copying machine 12 so that the mirror 88 is pivoted between the lower-limit position shown by the solid line in FIG. 11 and the upper-limit position shown by the chain line in the same figure.

The base frame 134 is provided with a bottom opening 166. The projecting and recording system body 10 and the copying machine 12 (shown in FIGS. 1 and 2) are spatially communicated with each other through the bottom opening 166 and another opening 166A (see FIG. 23) provided in the copying machine 12.

As shown in FIGS. 11 and 12, the second mirror 72 is defined by a trapezoidal plane mirror and rigidly secured to the first subbase frame 148 through a bracket 168. The second mirror 72 is inclined at an angle θ with respect to the base frame 134 in a manner similar to that of the screen 80 and at the same time, the second mirror 72 is inclined at angle of 45° with respect to the longitudinal axis of the projecting and recording system body 10.

As shown in FIGS. 12 and 14 (a sectional view taken along the line XIV—XIV in FIG. 2), the first mirror 74 is similarly defined by a trapezoidal plane mirror and rigidly secured to a second subbase frame 170 (see FIG. 14) through a bracket 172. The first mirror 74 is inclined at an angle θ with respect to the base frame 134 and at the same time, the mirror 74 is inclined at an angle of 45° with respect to the longitudinal axis of the projecting and recording system body 10 as shown in FIG. 12 in a manner similar to that of the second mirror 72. The second subbase frame 170 is, as shown in FIG. 14, rigidly secured to the base frame 134 at an angle of inclination θ through stays 174.

As shown in FIG. 14, the main lens 76 is incorporated in a lens tube 76A and rigidly secured to the second subbase frame 170 together with a processing head 176 in one unit. The main lens 76 is disposed in such a manner that the optical axis thereof is inclined at an angle θ with respect to the base frame 134.

The conversion lens 82 is, as shown in FIG. 14, disposed between the first mirror 74 and the main lens 76, and adapted to be movable by a moving mechanism (not shown) between two positions, that is, a position at which the optical axis thereof is coincident with that of the main lens 76 and a position at which the lens 82 does not interfere with the lens 76.

As shown in FIG. 14, a bulkhead 178 is provided on the second subbase frame 170 in such a manner as to extend in a direction perpendicular to the frame 170, and a shutter 180 is disposed on the bulkhead 178 so that it is possible to shut the optical path defined between the main lens 76 and the first mirror 74. The shutter 180 is connected to an automatic exposure controller (not shown).

[Projecting Light Source Section]

Figure 15:
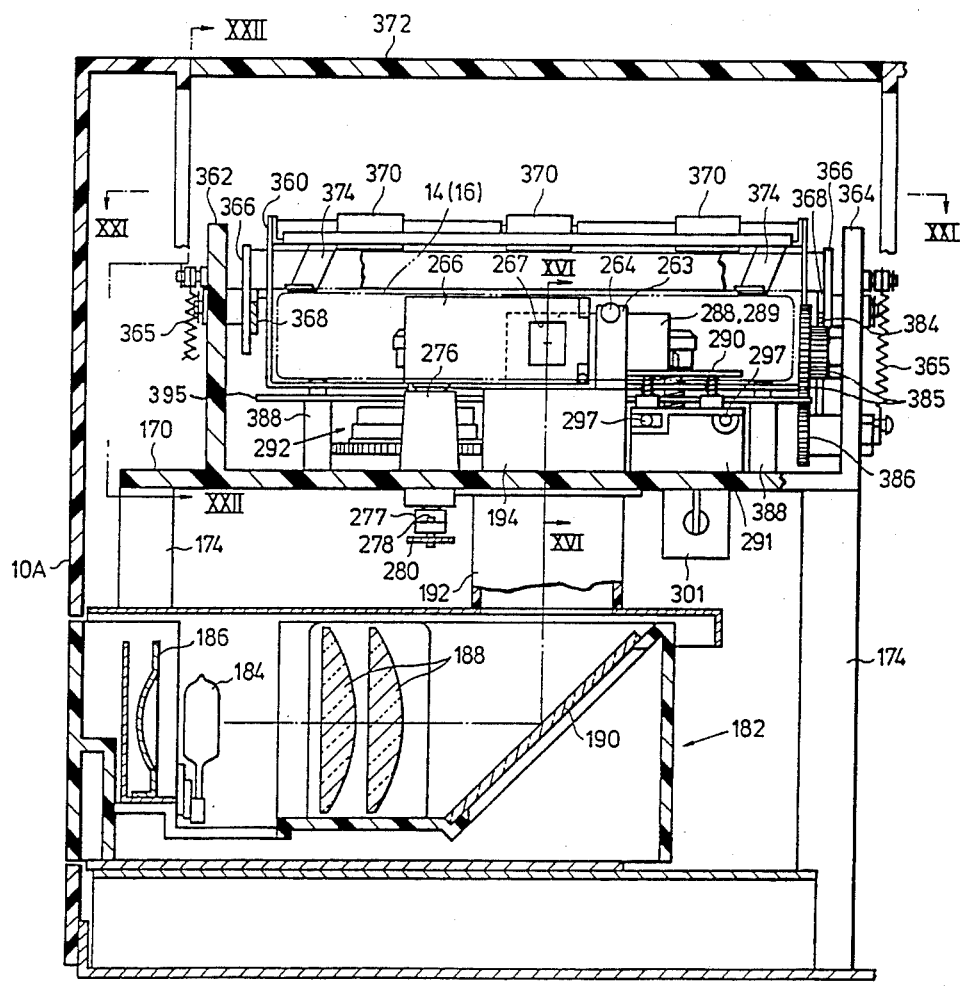

Referring to FIGS. 14 and 15 (a sectional view taken along the lines XV—XV in FIGS. 14 and 21, described later), a lamp box 182 is disposed in the projecting light source section 78. The lamp box 182 is, as shown in FIG. 15, provided with a halogen lamp 184 which defines a light sourse, a reflecting plate 186 disposed to the rear of the halogen lamp 184, condenser lenses 188 for condensing the light emitted from the halogen lamp 184, and a lower projecting mirror 190 adapted to reflect the light from the halogen lamp 184 at a right angle so that the light is projected upward.

It should be noted that a part of the lamp box 182 defines a part of a side wall of the housing 10A of the projecting and recording system body 10 as shown in FIGS. 1 and 15 so that the lamp box 182 can readily be removed from the body 10 when, for example, the lamp 184 is replaced with a new one.

Figure 16:
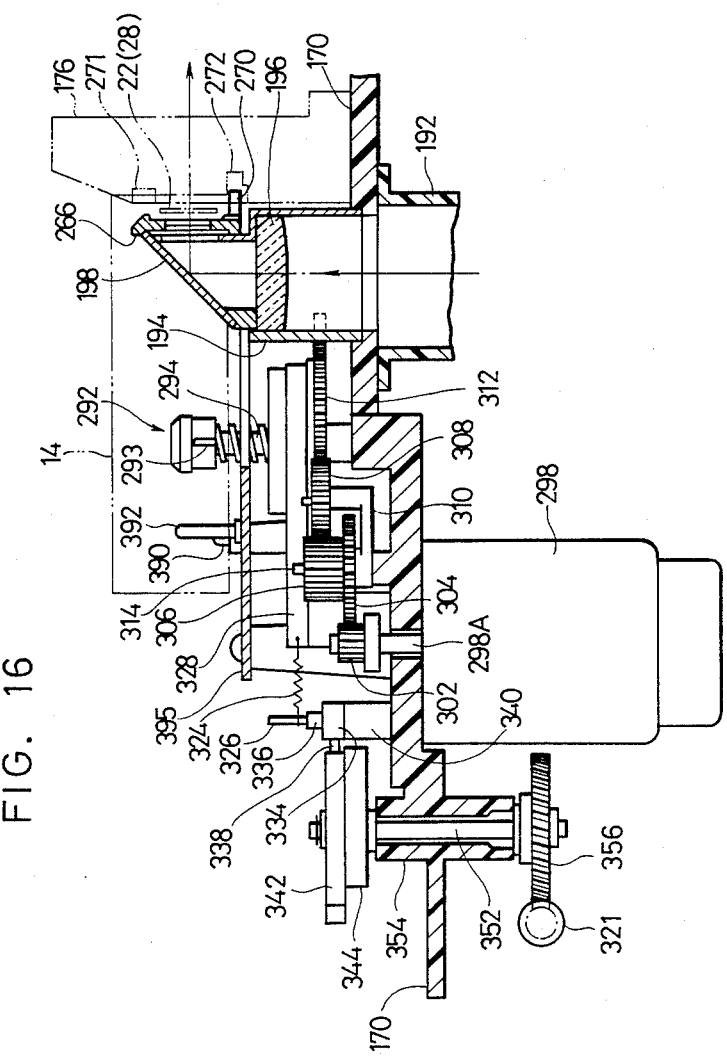

The projecting light source section 78 consists of the lamp box 182, a tubular member 192, a tubular member 194 (see FIG. 15), and a condenser lens 196 as well as an upper projecting mirror 198 respectively supported by the intermediate and upper portions of the tubular member 194 as shown in FIG. 16 (a sectional view taken along the line XVI—XVI line in FIG. 15). The tubular member 192 is suspended from the second subbase frame 170 in such a manner that the tubular member 192 extends between the frame 170 and the lamp box 182 to prevent scattering of the light from the halogen lamp 184 which passes through the inside of the tubular member 192.

The tubular member 194 is provided on the second subbase frame 170 in such a manner as to project upward therefrom. The inside of the tubular member 194 is communicated with that of the tubular member 192, and an opening is provided in the upper part of the tubular member 194 so as to face the processing head 177 as shown in FIG. 16. Thus, the light from the halogen lamp 184 is first reflected by the lower projecting mirror 190 and condensed by the condenser lens 96 so as to be incident on the upper projecting mirror 198 from the lower side thereof, and the upper projecting mirror 198 reflects the light at a right angle so that the reflected light is projected toward the processing head 176.

As shown in FIG. 14, a cooling fan 200 is rigidly secured to the base frame 134 adjacent to the lamp box 182. The fan 200 is provided for the purpose of cooling the halogen lamp 184 which has heated up and the atmosphere within the housing 10A which has been raised in temperature by the halogen lamp 184. The warm air inside the housing 10A is discharged from a louver 202 shown in FIG. 1.

[Processing Head]

Figure 17:
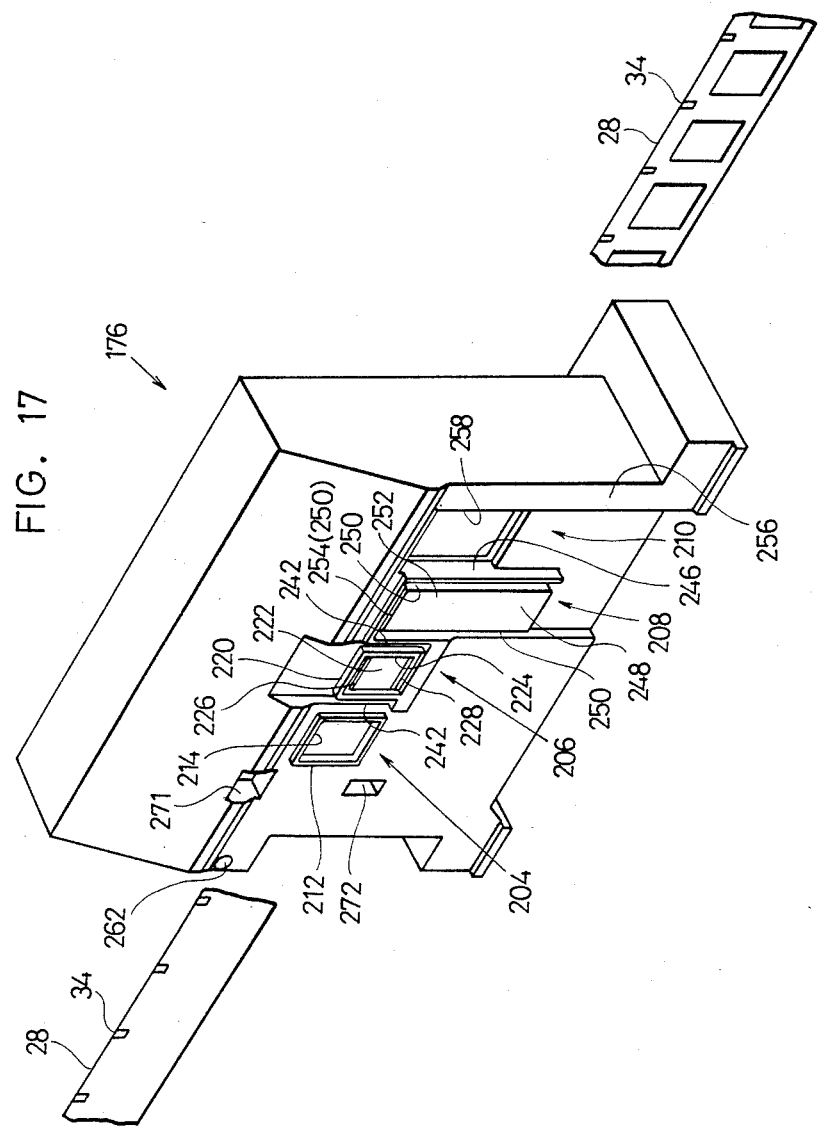
Figure 18:
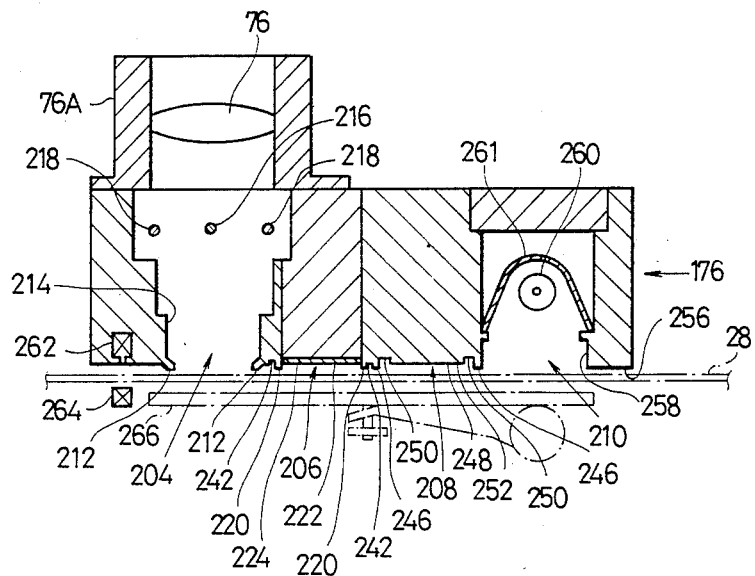

Referring to FIGS. 14 and 16, the processing head 176 is rigidly secured to the second subbase frame 170 in such a manner that the processing head 176 is disposed adjacent to the tubular member 194 as shown in FIG. 16. The processing head 176 is, as shown in FIGS. 17 and 18, provided with a charging exposure section 204, a developing section 206, a drying section 208 and a fixing section 210.

The charging exposure section 204 has a projecting frame 212 which is adapted to contact the edge portion of each frame of the electrophotographic film 28. A charging exposure chamber 214 is provided on the inner side of the projecting frame 212, the chamber 214 being defined by a space which extends horizontally (in the vertical direction as viewed in FIG. 18). In the charging exposure chamber 214 are disposed a corona wire 216 which extends vertically (in the direction perpendicular to the plane along which FIG. 18 is taken) and corona electrodes 218 disposed on both sides, respectively, of the corona wire 216. The main lens 76 is mounted on the rear side (the side which is remote from the projecting frame 212) of the processing head 176 through the lens tube 76A. It should be noted that the optical axis of the main lens 76 is made coincident with the center of the projecting frame 212. The charging exposure chamber 214 faces the upper projecting mirror 198 supported by the tubular member 194 as shown in FIG. 16.

The developing section 206 has a projecting frame 220. The width of the opening defined by the projecting frame 220 is set such as to be slightly smaller than that of the opening defined by the projecting frame 212. A developing electrode 222 which is formed from a metal sheet is disposed within the opening defined by the projecting frame 220. The developing electrode 222 is positioned in such a manner that the outer surface thereof is located at a position which is slightly inner than the end face of the projecting frame 220. The space surrounded by the projecting frame 220 and the developing electrode 222 defines a developing chamber 224. An opening is provided between the upper edge of the electrode 222 and the projecting frame 220 to define a developer inlet 226, and another opening is provided between the lower edge of the electrode 222 and the projecting frame 220 to define a developer outlet 228, the developer inlet and outlet 226, 228 having a width equal to that of the electrode 222.

The developer inlet 226 is communicated with a developer tank 232 through a solenoid valve 230 shown in FIG. 14. The developer tank 232 is communicated with a developer bottle 238 storing a developer through a pump 236 which is driven by a motor 234. The developer is formed by dispersing toner particles in a solvent. A charging regulator is mixed to the developer so that the toner particles are readily charged negative. The developer outlet 228 is communicated with the developer bottle 238. Air which is pumped from a pressure squeezing pump 240 is discharged from the developer inlet 226.

Recesses 242 are respectively provided in the right and left sides of the projecting frames 220. An opening is provided in a part of each of the recesses 242 and communicated with a suction squeezing pump 244. It should be noted that pipes for connecting various devices or members are not shown in FIG. 14.

The drying section 208 has a projecting frame 246. The projecting frame 246 consists of an upper frame member and right and left frame members and has no lower frame member. The width of the opening definced by the projecting frame 246 is set such as to be larger than that of the opening defined by the projecting frame 212. A wall 248 is formed inside the projecting frame 246 in such a manner that the surface of the wall 248 is located at a position which is lightly inner than the end face of the projecting frame 246. Recesses 250 are defined between the wall 248 and the projecting frame 246. The space surrounded by the projecting frame 246, the wall 248 and the recesses 250 defines a drying chamber 252. An opening is provided in the recess 250 which is located at the upper part of the wall 248 so as to provide a warm air outlet 254.

The fixing section 210 is defined between the right frame member (as viewed in FIG. 17) of the projecting frame 246 and a projecting wall 256 which defines the right-hand end portion of the processing head 176. The space in the fixing section 210 defines a fixing chamber 258. In the fixing chamber 258 are disposed a xenon lamp 260 and a reflecting plate 261 for reflecting the light emitted from the lamp 260. The width of the opening in the fixing chamber 258 is set such as to be larger than that of the opening in the drying chamber 252.

The respective end faces of the projecting frames 212, 220 and 246 are flush with each other. In addition, the charging exposure chamber 214, the developing chamber 224, the drying chamber 252 and the fixing chamber 258 are arranged so that consecutive frames of the electrophotographic film 28 are able to face these chambers, respectively, at the same time.

The processing head 176 has a blip sensor 262 which is disposed at a position on the left-hand end portion thereof (as viewed in FIG. 17) which is slightly above the upper end of the projecting frame 212 of the charging exposure section 204. The blip sensor 262 is defined by a light-receiving element and faces a sensor light source 264 disposed on a side pillar 263 which is integral with the tubular member 194 (see FIG. 15).

As shown in FIG. 18, a pressing plate 266 is disposed in front of the processing head 176. The pressing plate 266 is, as shown in FIG. 19, provided with a rectangular through-hole 267 which is a size smaller than the opening defined by the projecting frame 212 formed in the charging exposure section 204. The pressing plate 266 is disposed in such a manner that the through-hole 267 opposes the projecting frame 212.

As will be clear from FIG. 19A (a perspective view of the pressing plate 266 shown in FIG. 19, as viewed from the opposite side), the pressing plate 266 has fitting members 268 and 269 respectively formed on the upper and lower end portions on the side of the plate 266 which is closer to the through-hole 267, the fitting members 268 and 269 projecting toward the processing head 176. The opposing inner surfaces of the fitting members 268 and 269 are slanted as shown by the reference numerals 268A and 269A. The distance between the respective root portions of the upper and lower fitting members 268 and 269 is set such as to be equal to the width of the electrophotographic film 28 (strictly speaking, said distance being slightly larger than the width of the film 28), as shown in FIG. 16. A columnar portion 270 projects from the distal end of the fitting member 269. The fitting members 268 and 269 are able to be fitted into bores 271 and 272, respectively, formed in the processing head 176, as shown in FIG. 17.

The pressing plate 266 has a columnar portion 273 projecting from the reverse surface thereof, that is, the surface thereof which is remote from the processing head 176. This columnar portion 273 is engaged with a notched portion 274A formed at one end portion of an arm 274. A stop ring 273A is rigidly secured to the distal end portion of the columnar portion 273 so as to prevent the arm 274 from coming off the columnar portion 273. A boss portion 274B is formed at the other end of the arm 274. A shaft 275 is rigidly secured to the boss portion 274B.

The shaft 275 is rotatably fitted into and thereby supported by a stand 276 projecting from the second subbase frame 170 to which the processing head 176 is secured, the lower end portion of the shaft 275 projecting from the reverse surface of the frame 170. A first lever 277 is rigidly secured to the projecting lower end portion of the shaft 275. A pin 278 is rigidly secured to the distal end portion of the first lever 277.

A shaft 279 is suspended from the reverse side of the second subbase frame 170. The shaft 279 pivotally supports the intermediate portion of a second lever 280. A notched portion 280A is formed at one end of the second lever 280, and the pin 278 is engaged with the notched portion 280A. A slot 280B is formed in the other end portion of the second lever 280, and one end portion of each of the tension coil springs 281 and 282 is retained by the slot 280B, the springs 281 and 282 biasing the second lever 280 in the opposite directions to each other so as to support the lever 280 resiliently.

The other end portion of the tension coil spring 281 is retained by a pin 283 suspended from the reverse side of the second subbase frame 170, while the other end portion of the tension coil spring 282 is retained by a plunger 284A of a pull-type solenoid 284 which is secured to the reverse side of the frame 170.

When the solenoid 284 is not energized, the pressing plate 266 is separated from the processing head 176. In this state, the pressing plate 266 is supported in such a manner that the columnar portion 270 is fitted into the bore 272 formed in the processing head 176 as shown in FIG. 16.

[Magnetic Head]

Figure 21:
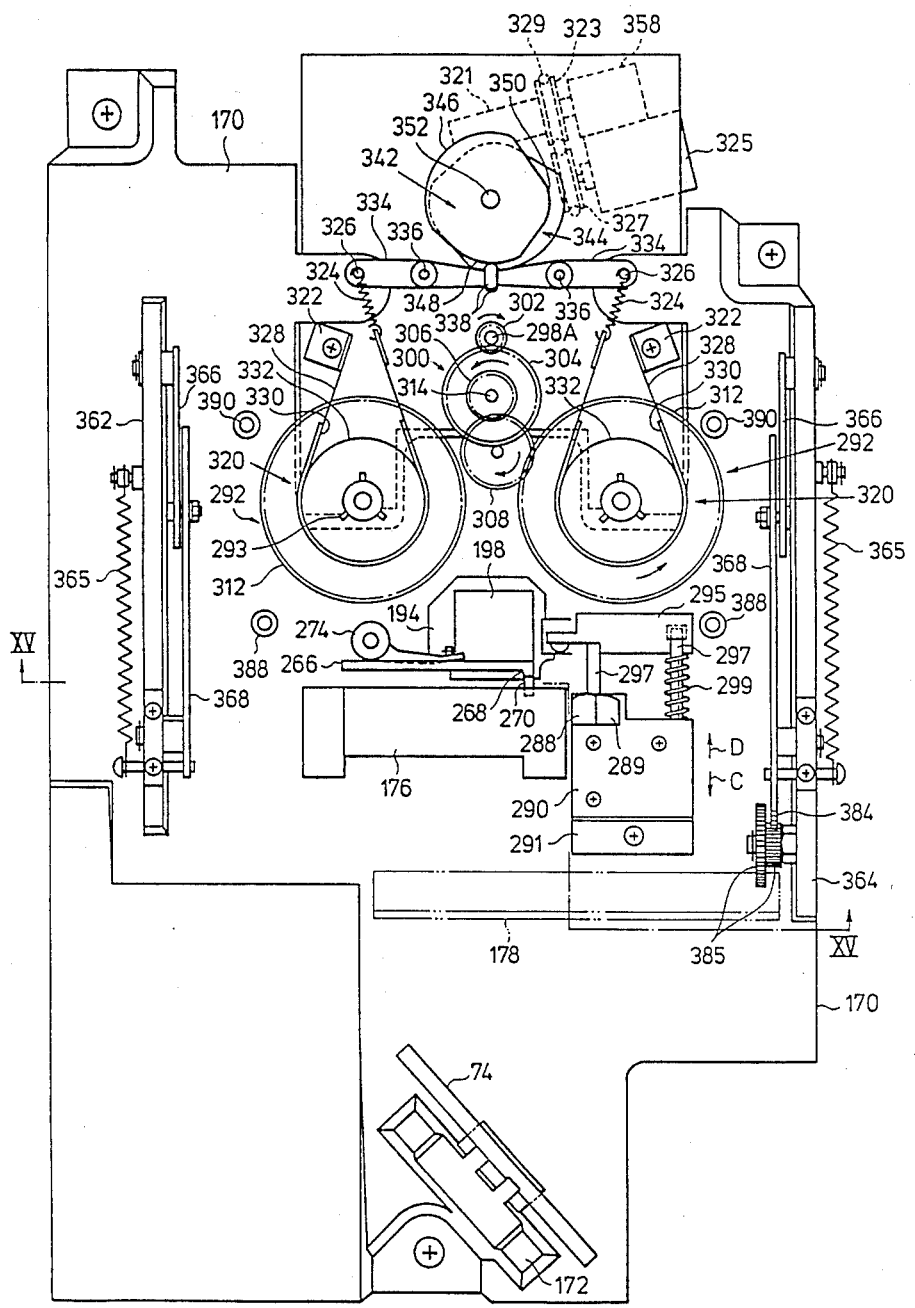

Referring to FIG. 21 (a sectional view taken along the line XXI—XXI in FIG. 15), a recording and reproducing magnetic head 288 and an erasing magnetic head 289 for the magnetic tape 26 are disposed adjacent to the processing head 176. The magnetic heads 288 and 289 are secured to a bracket 290 which, in turn, is mounted on a base 291 rigidly secured to the second subbase frame 170. The bracket 290 is adapted to be movable along a shaft 297 which is supported by the second subbase frame 170 through a member 295.

The bracket 290 is biased in the direction of the arrow C by means of a compression coil spring 299 wound on the shaft 297. However, when a solenoid 301, which is rigidly secured to the reverse side of the second subbase frame 170 as shown in FIG. 15, is energized, the bracket 290 is moved in the direction of the arrow D against the biasing force of the spring 299. The recording and reproducing magnetic head 288 and the erasing magnetic head 289 are positioned at the same level as that of the charging exposure chamber 214 and other chambers.

[Tape Driving Section]

Figure 20:
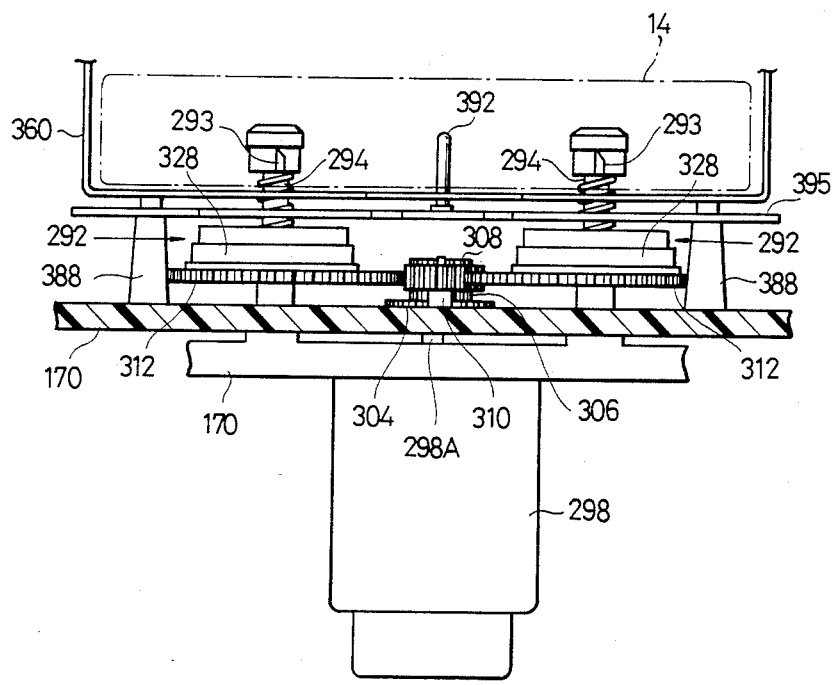

Referring to FIG. 20 (a sectional view taken along the line XX—XX in FIG. 14) and FIG. 21, a pair of reel tables 292 are disposed on the second subbase frame 170. Reel engaging projections 293 project radially from the top of each reel table 292. Each reel table 292 is rotatably supported by the second subbase frame 170 through a pin 294. Both the reel tables 292 can be rotated by a motor 298 (see FIG. 20) disposed on the reverse side of the second subbase frame 170 through a driving force transmission mechanism 300.

As shown in FIGS. 16 and 21, the transmission mechanism 300 consists of a gear 302 rigidly secured to a shaft 298A of the motor 298, a first intermediate gear 304, a second intermediate gear 306, a third intermediate gear 308, an oscillating plate 310, and gears 312 which are defined by the respective lower disk portions of the reel tables 292.

The first and second intermediate gears 304 and 306 are coaxially connected together in one unit and rotatably supported by a pin 314 which projects upward from the second subbase frame 170. The oscillating plate 310 is interposed between the second subbase frame 170 and the first intermediate gear 304 and pivotally supported by the pin 314. The third intermediate gear 308 is rotatably supported by the oscillating plate 310.

The gear 302 is meshed with the first intermediate gear 304, and the second intermediate gear 306 is meshed with the third intermediate gear 308 which, in turn, is meshed with either one of the gears 312 on the reel tables 292 in accordance with the direction of rotation of the motor 298.

As shown in FIG. 21, a band brake 320 for applying back tension to the tape 22 is dispersed on each of the reel tables 292. The band brake 320 has a steel sheet band 328 retained at one end thereof by the second subbase frame 170 through a retainer piece 322, the other end of the band 328 being retained by a pin 326 through a tension coil spring 324. A felt brake shoe 330 is bonded to the band 328. The brake shoe 330 is tightly wound on a cylindrical portion 332 of the reel table 292 under pressure by means of the tensile force applied from the tension coil spring 324.

The pin 326 projects upward from one end of an arm 334. The intermediate portion of the arm 334 is pivotally supported by a pin 336 projecting upward from the second subbase frame 170. An abutment piece 338 is formed at the other end of the arm 334. The band brakes 320 are respectively disposed on the pair of right and left reel tables 292 in symmetry with each other. As shown in FIG. 16, each arm 334 has a collar 340 which is fitted on the associated pin 336 to separate the arm 334 from the surface of the second subbase frame 170. Since the respective collars 340 of the two arms 334 have different heights, the arms 334 are disposed at different levels, so that their respective abutment pieces 338 overlap each other without any interference.

The abutment pieces 338 positioned in overlapping relation to each other are in pressure contact with cam plates 342 and 344, respectively. Each of the cam plates 342 and 344 has a large-diameter portion 346, an intermediate-diameter portion 348 and a small-diameter portion 350. The two cam plates 342 and 344 have the same configuration and are rigidly secured to a shaft 352 in such a manner that one of them is turned upside down and made out of phase from the other. The shaft 352 is received and thereby rotatably supported by a bearing portion 354 formed on the second subbase frame 170, the lower end portion of the shaft 352 projecting from the reverse side of the frame 170.

A worm wheel 356 is rigidly secured to the lower end portion of the shaft 352. The worm wheel 356 is meshed with a worm 321 which is rotatably supported in a cantilever fashion by a bearing member 358 secured to the reverse side of the second subbase frame 170. A pulley 323 is rigidly secured to a shaft which supports the worm 321. The pulley 323 is connected through a transmission belt 329 to a pulley 327 which is rigidly secured to the shaft of a motor 325 mounted on the reverse side of the second subbase frame 170.

[Cassette Loading Section]

Figure 22:
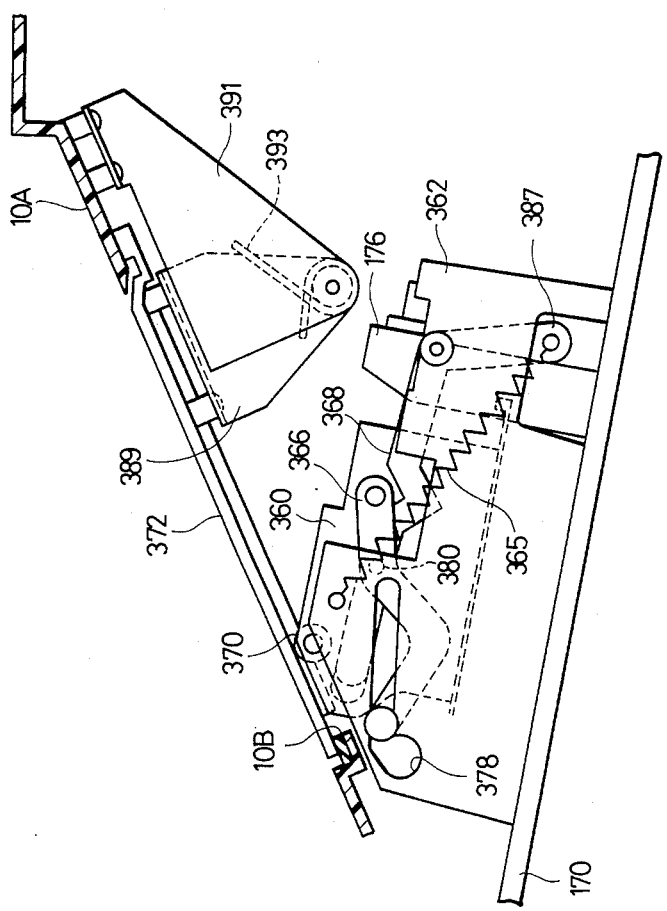

Referring to FIGS. 15 and 22 (a sectional view taken along the line XXII—XXII in FIG. 15), the cassette loading section has a cassette holder 360 for holding the cassette 14, cassette holder brackets 362, 364 which project upward from the second subbase frame 170 to support the cassette holder 360, and a pair of first arms 366 and a pair of second arms 368, which connect the cassette holder 360 and the cassette holder brackets 362, 364.

Retainer members 374 made from metal leaf springs and adapted to resiliently retain the cassette 14 are secured to the right and left end portions, respectively, of the cassette holder 360. Two retainer members 374 are provided on one of said right and left end portions in series relation to each other, and these retainer members 374 serve also as contact pieces which are brought into pressure contact with the external contacts 50 provided on the cassette 14. In addition, rollers 370 are rotatably disposed on the cassette holder 360. The cassette holder brackets 362 and 364 are respectively positioned on both outer sides of the pair of reel tables 292. As shown in FIG. 22, one end portion of each of the first arms 366 is movably supported by a slot 378 provided in the corresponding cassette holder bracket 362 or 364, and one end portion of each of the second arms 368 is pivotally supported by the bracket 362 or 364.

The corresponding first and second arms 366 and 368 are disposed in such a manner as to intersect each other, and pivotally connected together at the intersection by means of a pin 380. The other end portion of each of the first arms 366 is pivotally connected to the cassette holder 360. The other end portion of each of the second arms 368 is movably supported by a slot 382 provided in the cassette holder 360, as shown in FIG. 22A.

A sector gear 384 is, as shown in FIG. 21, formed on one end portion of one of the second arms 368 on the side thereof which is closer to the position at which said arm 368 is pivotally connected to the associated cassette holder bracket 364. The sector gear 384 is meshed with a gear 385 which, in turn, is meshed with a rotary damper 386 as shown in FIG. 15. Both the gear 385 and the rotary damper 386 are secured to the cassette holder bracket 364.

In addition, each of the second arms 368 has a lever 387 extending from one end portion thereof which is closer to the position at which the arm 368 is pivotally connected to the corresponding cassette holder bracket 362 or 364. One end of a tension coil spring 365 is retained by the lever 387. The other end of the spring 365 is retained by the cassette holder bracket 362 or 364. Thus, each of the second arms 368 is biased so as to pivot clockwise as viewed in FIG. 22 about the positioned at which the arm 368 is pivotally connected to the corresponding cassette holder bracket 362 or 364, but the arm 268 is locked in the position shown in FIG. 22 by virtue of a stopper mechanism (not shown).

An opening 10B is provided in that portion of the housing 10A of the projecting and recording system body 10 which is positioned above the cassette holder 360, and a cover 372 is disposed at the opening 10B. The cover 372 is pivotally mounted to the housing 10A through brackets 389 and 391 which are pivotally connected to each other. The cover 372 is biased counterclockwise as viewed in FIG. 22 by means of a torsion coil spring 393, and normally covers the opening 10B as shown in FIG. 22. In this state, the rollers 370 are in contact with the reverse side of the cover 372.

As shown in FIG. 21, two pairs of cassette positioning pins 388 and 390 are provided on the second subbase frame 170 in such a manner as to project upward around the reel tables 292. The top surfaces of the cassette positioning pins 388 abut against the positioning projections 56A, respectively, which are formed on the reverse surface of the cassette casing 16, thereby effecting positioning of the cassette 14 in the heightwise direction thereof, and the cassette positioning pins 390 are respectively fitted into the positioning holes 56B to effect positioning of the cassette 14 in the lateral direction thereof (in the direction which intersects both the pair of reel tables 292).

In addition, a cover 395 covers the reel tables 292 and the gears and other members of the transmission mechanism 300, and a brake release pin 392 which releases the brake mechanism of the cassette 14 is provided on the cover 395 so as to project therefrom upwardly.

[Copying Machine]

Figure 23:
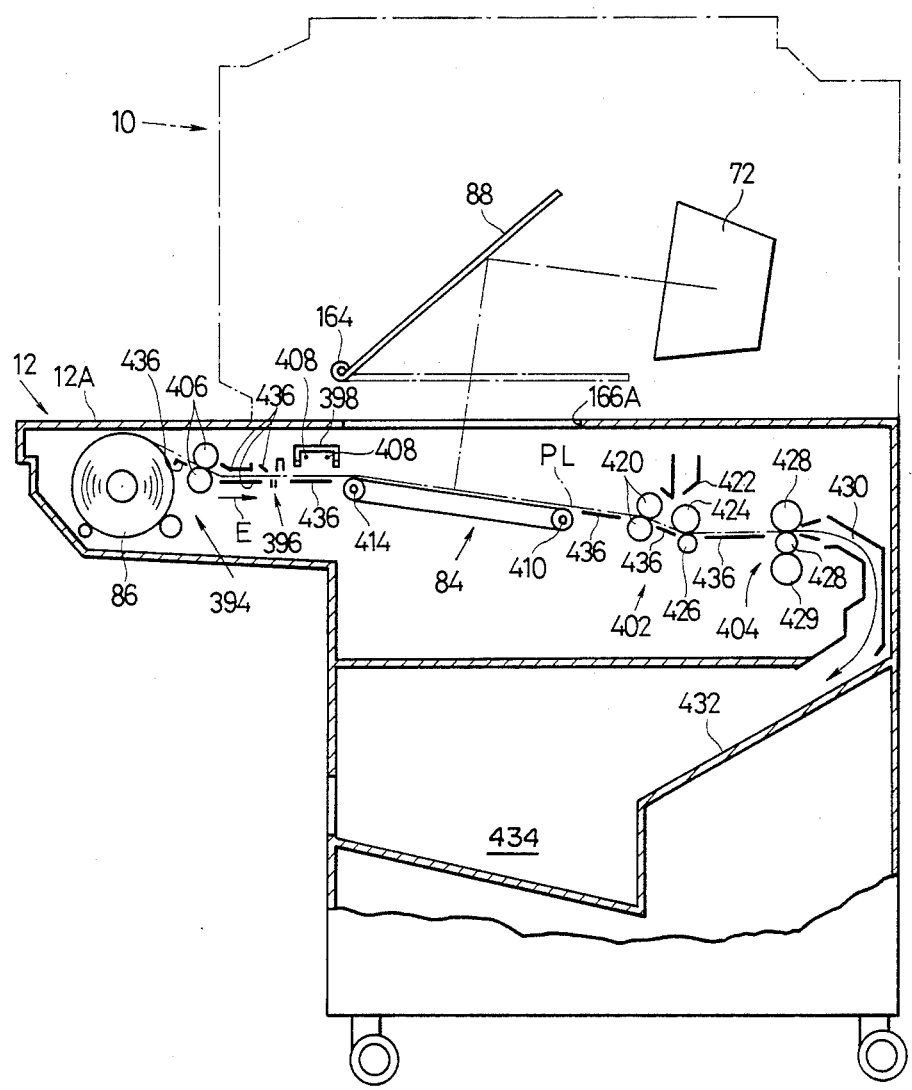

Referring to FIG. 23 (a sectional view taken along the line XXIII—XXIII in FIG. 2), the copying machine 12 has a paper feed section 394 in which a copying paper 86 (CPC paper) in the shape of a roll is disposed, a cutter 396 for cutting the copying paper 86 into sheets, a charging device 398 for charging each sheet of copying paper 86 cut by the cutter 396, the exposing table 84 for supporting the charged sheet of copying paper 86 at an exposing position, a developing device 402 for developing the exposed sheet of copying paper 86, and a fixing device for fixing the developed sheet of copying paper 86.

Figure 24:
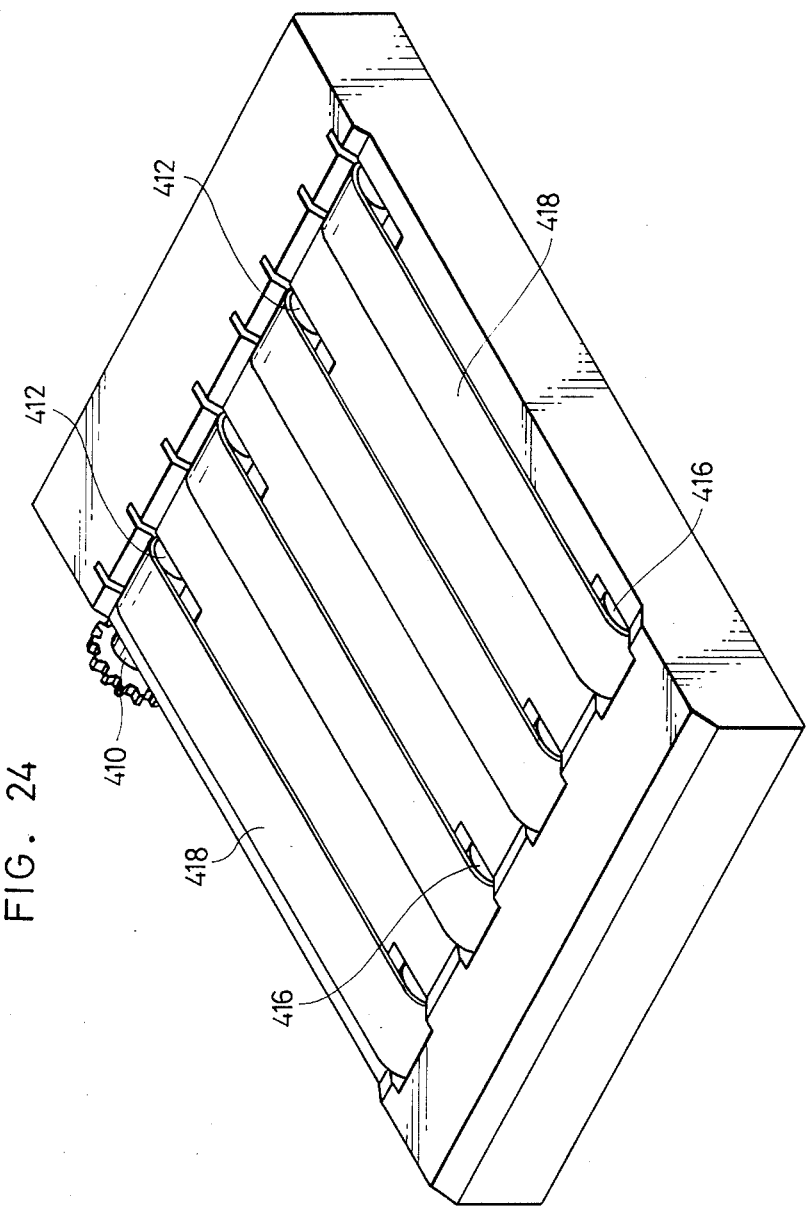

A pair of feed rollers 406 are disposed in the paper feed section 394 to unwind the copying paper 86 in the shape of a roll and transport the paper 86 in the direction of the arrow E. A clutch (not shown) is associated with the feed rolles 406. Corona wires 408 for effecting corona discharge are disposed in the charging device 398. The exposing table 84 is disposed below the copy mirror 88 and has, as shown in FIG. 24, crowned rollers 412 provided in a row on a driving shaft 410, crowned rollers 416 provided in a row on a driven shaft 414 (see FIG. 23), and endless belts 418 respectively stretched between the pairs of rollers 412 and 416.

The developing device 402 has a pair of feed rollers 420, a toner tank 422 storing toner, a toner roller 424 to the peripheral surface of which is attached the toner from the toner tank 422, and a feed roller 426 disposed in opposing relation to the toner roller 424. The fixing device 404 consists of a pair of pressure rollers 428 and a back-up roller 429.

On the downstream side of the fixing device 404 are disposed a delivery passage 430 for guiding the sheet of copying paper 86 having been subjected to fixing process, a slope 432 for guiding the sheet 86 passed through the delivery passage 430, and a paper stacker 434 which has an opening provided in the front side of the copying machine 12.

It should be noted that, in FIG. 23, the reference numeral 436 denotes a guide plate for guiding each sheet of copying paper 86, and the reference symbol P.L denotes a path line of the copying paper 86.

In addition, the feed rollers 406 in the paper feed section 394, the driving shaft 410 in the exposing table 84, the feed rollers 420, 426 and the toner roller 424 in the developing device 402, and the pressure rollers 428 and the back-up roller 429 in the fixing device 404 are simultaneously driven by means of a power transmitted thereto from a driving gear (not shown).

The copy mirror 88 is biased counterclockwise as viewed in FIG. 23 by the action of a biasing means (not shown), but when the copying machine 12 is in an inoperative state, the copy mirror 88 is pulled by a wire connected to a cam mechanism activated by the driving gear incorporated in the copying machine 12 so that the copy mirror 88 stands by at the position shown by the chain line in FIG. 23. When the driving gear is activated, the wire is loosened by the action of the cam mechanism, so that the copy mirror 88 is moved to the position shown by the solid line in FIG. 23 by the addition of the biasing means.

[Control Section]

As shown in FIGS. 1 and 2, a control keyboard 438 for controlling the projecting and recording system is disposed on the projecting and recording system body 10. On the control keyboard 438 are disposed, e.g., control buttons and display means for displaying numerals and an operative state of the system.

[Operation of the Embodiment]

The following is a description of the operation of the projecting and recording system in accordance with this embodiment. The projecting and recording system has various functions: namely, the camera function which enables the image of a document to be recorded on an electrophotographic film accommodated in a cassette; the reader function which enables the image recorded on the film in the cassette to be enlarged and projected on a screen; and the copy function which enables the image recorded on the film to be enlarged and copied on a sheet of copying paper. These functions will successively explained below.

The operation of loading a cassette into the projecting and recording system will first be explained.

When the power switch of the projecting and recording system is turned on, the stopper mechanism (not shown) retaining the cassette holder 360 is canceled, so that the second arms 368, which are subjected to the biasing forces from the tension coil springs 365, are pivoted clockwise from the position shown in FIG. 22 about their respective portions at which they are pivotally connected to the cassette holder brackets 362 and 364, respectively, and the second arms 368 are thereby erected. In consequence, the other end portion of each of the second arm 368 is moved through the slot 382 provided in the cassette holder 360, and one end portion of each of the first arms 366 is moved through the slot 378 formed in the corresponding cassette holder bracket 362 or 364, thus causing the cassette holder 360 to be raised.

The cassette holder 360 causes the cover 372 to pivot against the biasing force from the torsion coil spring 393 while the rollers 370 are in rolling contact with the reverse side of the cover 372. In this way, the cassette holder 360 forces the cover 372 to open and springs out of the housing 10A of the projecting and recording system body 10. During this movement of the cassette holder 360, the rotary damper 386 (shown in FIG. 15) acts so as to generate damping force. There is therefore no fear of any impact being generated when the cassette holder 360 is stopped in the position shown in FIG. 22A.

The cassette 14 is inserted into the cassette holder 360 in the direction of the arrow shown in FIG. 22A. After the cassette 14 has completely been inserted into the cassette holder 360, the cover 372 is pushed downward so as to be closed by a manual operation. As the cover 372 is moved downward, the second arms 368 are pivoted counterclockwise from the position shown in FIG. 22A against the biasing forces from the respective tension coil springs 365, and thereby flattened. In consequence, the first and second arms 366 and 368 are moved through the respective slots 378 and 382 in the reverse direction to the above, and the cassette holder 360 is thereby withdrawn into the housing 10A of the projecting and recording system body 10, as shown in FIG. 22.

When the cover 372 is moved back to the position at which it closes the opening 10B provided in the housing 10A of the projecting and recording system body 10, the cassette holder 360 is retained by the stopper mechanism (not shown). Accordingly, when the manual pushing operation is canceled, there is no fear of the casette holder 360 springing out. Thus, the loading of the cassette 14 into the projecting and recording system body 10 is completed.

In this state, the cassette 14 is accurately positioned at a predetermined position in the projecting and recording system body 10 by virtue of the positioning pins 388 and 390 shown in FIG. 21. Further, when the cassette 14 is in this state, the casette casing 16 is raised by the positioning pins 388 and 390 so that the reverse surface of the cassette casing 16 is separated from the bottom of the cassette holder 360 as shown in FIG. 15. As the cassette casing 16 is moved upward from the bottom of the cassette holder 360, the retainer members 374 are brought into pressure contact with the upper surface of the cassette casing 16. Thus, the cassette casing 16 is resiliently held from the upper side thereof, and the electrophotographic film 28 is grounded through the projecting and recording system.

In the course of the cassette holder 360 being pushed in as described above, the guard panel 18 of the cassette 14 is brought into contact with a member (not shown) and thereby pivoted to the position shown by the chain line in FIG. 4. Therefore, when the cassette 14 is in a loaded state, the tape 22 is exposed at the front side of the cassette casing 16. The tubular member 194 is positioned within the recess 20 in the cassette casing 16 as shown in FIG. 16, and the tape 22 is therefore positioned in a gap defined between the processing head 176 and the pressing plate 266.

At the same time, the brake release pin 392 (see FIG. 20) projecting upward from the cover 395 enters the through-hole 58 provided in the reverse surface of the cassette casing 16 to release the brake mechanism (not shown) which has locked the reels 32 from rotating. Therefore, when the cassette 14 is in a loaded state, the reels 32 are rotatable in both clockwise and counterclockwise directions. Further, in this state, the projecting walls 52 formed on the boss portion 46 of each reel 32 are engaged with the reel engaging projections 293 formed on the corresponding reel table 292 shown, for example, in FIG. 21.

The operation of positioning an electrophotographic film will next be explained.

In any case where an image is to be recorded on the electrophotographic film 28, or an image recorded on the film 28 is to be projected or copied, a frame concerned is positioned in front of the charging exposure chamber 214 of the processing head 176. Data concerning each of the frames on the electrophotographic film 28 has been recorded on the magnetic tape 26 spliced to the film 28 through the recording and reproducing magnetic head 288, and it is therefore possible to read the data through the magnetic head 288.

To record or reproduce data, the solenoid 301 is energized so as to move the recording and reproducing magnetic head 288 in the direction of the arrow D shown in FIG. 21 against the biasing force from the compression coil spring 299, and the magnetic head 288 is thereby brought into close contact with the magnetic tape 26.

When a frame which is to be positioned at the charging exposure chamber 214 is determined, this frame is designated by actuating the buttons on the control keyboard 438. In consequence, the motor 298 (see FIG. 20) in the tape driving section shown in FIG. 21 is activated to rotate. The rotation of the motor 298 is transmitted to the first intermediate gear 304 through the gear 302 and further transmitted to the second and third intermediate gears 306 and 308.

When the right-hand reel table 292 (as viewed in FIG. 21) is selected to be a driving reel table and rotated counterclockwise, i.e., in the arrowed direction, the gear 302 is rotated clockwise, i.e., in the arrowed direction. In response to the rotation of the gear 302, the second intermediate gear 306 which is rotated counterclockwise together with the first intermediate gear 304 causes the third intermediate gear 308 to pivot counterclockwise about the pin 314. In response to the pivotal movement of the third intermediate gear 308, the oscillating plate 310 is also pivoted, and the third intermediate gear 308 is rotated clockwise. In this position, the third intermediate gear 308 is meshed with the gear 312 formed on the right-hand reel table 292 (as viewed in FIG. 21), and the reel table 292 is thereby rotated through the third intermediate gear 308.

When the left-hand reel table 292 (as viewed in FIG. 21) is selected to be a driving reel table and driven to rotate clockwise, the gear 302 is rotated in the counterclockwise direction which is reverse to the above, and the oscillating plate 310 is consequently pivoted in the reverse direction to the above, thus causing the third intermediate gear 308 to mesh with the gear 312 formed on the left-hand reel table 292.

When one of the reel tables 292 is rotated, one reel 32 which is engaged with this reel table 292 is rotated, and the tape 22 is wound up on this reel 32. The tape 22 is unwound from the other reel 32, and this reel 32 is rotated as a supply reel while being pulled by the tape 22. Since an appropriate braking force is applied to each of the reel table 292 by the associated band brake 320, an appropriate back tension acts on the pulled tape 22 through the driven-side reel table 292, so that there is no fear of the tape 22 sagging or being damaged.

It should be noted that the back tension is adjusted in such a manner that the motor 325 is driven to turn the cam plates 342 and 344 at a predetermined angle through the pulley 327, the transmission belt 329, the pulley 323, the worm 321, the worm wheel 356 and the shaft 352, thus causing the band brakes 320 to apply an optimum braking force to the respective reel tables 292.

More specifically, as the cam plates 342 and 344 are turned, the abutment pieces 338 are displaced following the large-diameter portions 346, the intermediate-diameter portions 348 and the small-diameter portions 350. Consequently, the arms 334 are pivoted in accordance with the amounts of displacement of the respective abutment pieces 338, thereby controlling the tension of the tension coil springs 324. The angle of rotation of the cam plates 342 and 344 is automatically controlled on the basis of the tape speed, and the amount of the tape 22 remaining on the supply reel 32, etc. so that a substantially constant back tension is obtained.

Thus, the tape 22 is started to travel by rotating the reel tables 292, and when the electrophotographic film 28 passes the processing head 176, the passage of blip marks 34 each formed for one frame is sensed by the blip sensor 262. In this embodiment, the number of sensed blip marks 34 is counted, and a designated frame is identified by an ordinal number counted from a starting frame. When the designated frame is positioned at the charging exposure chamber 214, the drive of the motor 298 is suspended, and the rotation of the reel tables 292 is thereby stopped.

The following is a description of the operation of recording the image of a document on an electrophotographic film.

In this case, the document pressing plate 96 of the document table 64 shown, e.g., in FIG. 11 is first opened, and the document 66 (see FIG. 8) is placed on the upper side of the glass plate 92 in alignment with the positioning marks 112 (see FIG. 12) in such a manner that the side of the document 66 which is to be recorded faces downward. When the document pressing plate 96 is closed, the document 66 is fixed on the document table 64, and the reverse surface and/or the periphery of the document 66 is covered with the white pressing sheet 102.

When setting of the document 66 is completed, the camera mode is selected by actuating the buttons on the control keyboard 438. When the camera mode is selected, the motor 154 shown, e.g., in FIG. 11 is driven, and the take-up pulley 144 is thereby rotated through the worm 156, th worm wheel 152 and the shaft 146. As the take-up pulley 144 is rotated, the wire 140 is unwound from the pulley 144 in such a manner that the wire 140 is extended while the intermediate portion thereof is being guided by the pulley 142, thus causing the third mirror 70 to pivot clockwise from the position shown by the chain line in FIG. 11. The motor 154 is suspended when the mirror frame 136 comes in contact with the lower limit switch 158, and the third mirror 70 is stopped at the position shown by the solid line in FIG. 11.

When the pivotal movement of the third mirror 70 is stopped, the information that the preparation for recording has been completed is displayed on the control keyboard 438. When, in this state, the start button on the control keyboard 438 is pressed, the solenoid 284 shown in FIG. 19 is energized.

When the solenoid 284 is energized, the plunger 284A is activated to move in the direction of the arrow F, causing the tension coil springs 281 and 282 to be expanded against the biasing forces. In consequence, the second lever 280 is pivoted about the shaft 279 in the direction of the arrow G, so that the first lever 227 is pivoted about the pin 278 in the direction of the arrow H, thus causing the shaft 275 to turn in the same direction. Thus, the arm 274 is pivoted in the direction of the arrow J so as to press the pressing plate 266 in the direction of the arrow K.

The pressing plate 266 is moved in the direction of the arrow K while the columnar portion 270 is being guided by the bore 272, thus causing the electrophotographic film 28 to be pressed against the end faces of the projecting frames 212, 220 and 246. When the heightwise position of the film 28 is misaligned, the respective slanted surfaces 268A and 269A of the fitting members 268 and 269 act so as to push down the upper edge of the film 28 or push up the lower edge thereof as the pressing plate 266 is moved. When the pressing plate 266 is pressing the film 28 against the processing head 176, the fitting members 268 and 269 are respectively fitted in the bores 271 and 272, so that the film 28 is accurately positioned with respect to the processing head 176. In this state, the pressing plate 266 is allowed to resiliently press the film 28 by the action of the tension coil springs 281 and 282.

At the same time, a voltage is applied between the corona wire 216 and the corona electrodes 218 to generate corona discharge, thus causing the surface of the photosensitive layer 42 of the electrophotographic film 28 to be charged negative uniformly.

While the corona discharge is being carried out, the illuminating lamps 114 in the document illuminating apparatus 68 are turned on to illuminate the document 66. As shown in FIG. 13A, the central portion of the document 66 which is relatively remote from the illuminating lamps 114 is illuminated with the direct rays, and both end portions of the document 66 which are relatively close to the corresponding lamps 114 are illuminated with reflected rays. For this reason, no unevenness in illuminance is produced regardless of the distance from the illuminating lamps 114. The broundary between the central portion and each end portion of the document 66 is generally coincident with the boundary between the direct rays and the reflected rays. In this embodiment, however, the inner edge of the portion 116A of each reflecting plate 116 is serrated as shown in FIG. 12 so that direct rays and reflected rays cross each other in the vicinity of said boundary. Therefore, no dark region is produced at the boundary area.

In addition, the portion 116B of each reflecting plate 116 is stepwise enlarged in width in the direction in which the document 66 and the third mirror 70 become more distant from each other so that the illuminance on the surface of the document 66 is increased in this direction. In consequence, the illuminance of the reflected rays from the document 66 is made uniform over the third mirror 70.

At the same time as the completion of the corona discharge, the shutter 180 is opened, and an automatic exposure controller (not shown) starts integration of the quantity of light reflected from the document 66. When the integrated value of the quantity of light reaches a predetermined value, the automatic exposure controller generates a signal to close the shutter 180. At the same time, the controller generates a signal to turn off the illuminating lamps 114.

While the shutter 180 is open, the light reflected from the document 66 in accordance with the pattern of the image thereon is incident on the third mirror 70 and then passed through the second mirror 72, the first mirror 74 and the main lens 76 so as to be applied to the surface of the electrophotographic film 28 by the optical system shown in FIG. 8. Electric charge on the photosensitive layer 42 of the film 28 is reduced by the application of the light in accordance with the image pattern on the document 66, and an electrostatic latent image is thereby formed on the photosensitive layer 42.

Employment of the automatic exposure controller enables correction of factors in changes of the image density, such as variations in the ground density of the document 66 and variations in the voltage applied to the illuminating lamps 114, so that an optimal exposure operation is effected at all times.

After the shutter 180 has been closed, the solenoid 284 is de-energized by means of a controller (not shown). In consequence, the second lever 280, which is subjected to the biasing force from the tension coil spring 281, is pivoted counter to the direction of the arrow G. The pivotal movement of the second lever 280 causes the arm 274 to pivot counter to the direction of the arrow J, so that the notched portion 274A presses the stop ring 273A, causing the pressing plate 266 to move counter to the direction of the arrow K so as to separate from the electrophotographic film 28.

Thereafter, the motor 298 is activated to move the film 28 through a distance corresponding to one frame. Thus, the frame which has been exposed is moved and positioned in front of the developing chamber 224. The amount of movement of the film 28 is controlled by sensing blip marks 34. When the movement of the film 28 is suspended, the solenoid 284 is energized to activate the pressing plate 266 to press the film 28 against the processing head 176 in a manner similar to the above. At the same time, the suction squeezing pump 244 shown in FIG. 14 is activated to generate a vacuum in the recesses 242.

At the same time, the solenoid valve 230 is opened, and the developer which has been pump up into the developer tank 232 from the developer bottle 238 by the action of the pump 236 is allowed to flow into the developing chamber 224 from the developer inlet 226. The developer having flowed down through the developing chamber 224 is returned to the developer bottle 238 from the developer outlet 228, and while doing so, the toner particles which are charged negative adhere to portions of the film 28 which are charged negative, thereby developing the electrostatic latent image. During the developing operation, the presense of the developing electrode 222 prevents occurrence of any edge effect.

The developer leaking out to the right and left sides of the projecting frame 220 of the developing chamber 224 is sucked in by the action of the suction squeezing pump 244 from the recesses 242. When the solenoid valve 230 is closed, the supply of developer is suspended and at the same time, the pressure squeezing pump 240 is activated to supply pressurized air to the developing chamber 224 from the developer inlet 226, whereby surplus developer attached to, for example, the non-charged surface of the film 28 is blown off so as to be swished off.

The supply of the pressurized air by the pressure squeezing pump 240 is controlled in such a manner that a relatively weak blast is applied while a relatively large amount of developer remains in the developing chamber 224 in order to prevent deterioration of the quality of the image which would otherwise be caused by an operation in which the developer is blown off at high speed. When a predetermined period of time has elapsed after the application of the blast has been started, a relatively strong blast is applied to increase the squeezing efficiency.

When the operation of the pressure squeezing pump 240 is suspended, the solenoid 284 is de-energized, so that the pressing plate 266 is separated from the electrophotographic film 28. Thereafter, the motor 298 is activated to move the film 28 through a distance corresponding to one frame, and the developed frame is consequently positioned in front of the drying chamber 252. When the movement of the film 28 is stopped, the solenoid 284 is energized to cause the pressing plate 266 to press the film 28 against the processing head 176. At the same time, warm air is blown out from the warm air outlet 254, and the developer remaining on the film 28 is thereby dried.

When the application of warm air is finished, the pressing plate 266 is separated from the film 28 in a manner similar to the above. Thereafter, the film 28 is moved by an amount corresponding to one frame, and the frame concerned is thereby positioned in front of the fixing chamber 258. After the film 28 has been pressed against the processing head 176 by means of the pressing plate 266 in the same way as the above, the xenon lamp 260 is turned on, so that the toner particles are fused and fixed to the surface of the film 28 by the energy radiated from the lamp 260. Thereafter, the pressing plate 266 is separated from the film 28 in the same manner as the above.

Although each process has been described about only one frame of the electrophotographic film 28, it is also possible to continuously effect recording on consecutive frames. In such case, these frames are simultaneously subjected to different kinds of processing, respectively.

The following is a description of the operation of projecting an image recorded on an electrophotographic film by means of the optical system shown in FIG. 9.

In this case, a frame on the film 28 which is to be projected is positioned in front of the charging exposure chamber 214 of the processing head 176. In the system in accordance with this embodiment, the reader mode has automatically been selected when no button on the control keyboard 438 is actuated. In the reader mode, the third mirror 70 stands by in the position shown by the chain line in FIG. 11 in which the mirror 136 is in contact with the upper limit switch 160.

When the start button on the control keyboard 438 is pressed, the shutter 180 is opened, and the halogen lamp 184 in the projecting light source section 78 is turned on. In addition, the cooling fan 200 is activated. The light from the halogen lamp 184, together with the light reflected by the reflecting plates 186, is condensed by the condenser lens 188, reflected by the lower projecting mirror 190 so as to travel upward, condensed again by the condenser lens 196 and then reflected by the upper projecting mirror 198 so as to reach the rear surface of the electrophotographic film 28.

It should be noted that the lower projecting mirror 190 is defined by a cold mirror which transmits heat rays, and therefore the light reaching the film 28 has a relatively low temperature.

The light having reached the film 28 is transmitted thereby, and the image recorded on the film 28 is formed on the first mirror 74 by the main lens 76. The optical image formed on the first mirror 74 is reflected thereby so as to reach the second mirror 72, and the image is further reflected by the mirror 72, transmitted by the screen 80 and projected thereon.

In the reader mode, it is possible to continuously view projected images of the film 28 within a short period of time by successively advancing the film 28 for each frame through the control keyboard 438. In such case, every time the film 28 is moved, the shutter 180 is closed in order to prevent flickering due to persistence phenomenon.

The operation of copying an image recorded on an electrophotographic film by the optical system shown in FIG. 10 will be explained below.

When the copy button on the control keyboard 438 is pressed while an image is being projected on the screen 80, the drying gear in the copying machine 12 is activated, and the copy mirror 88 is started to pivot counterclockwise as viewed in FIG. 11 about the pin 164 by the action of the above-described mechanism. In addition, the conversion lens 82 for slightly reducing the size of the image on the screen 80 is moved to a position between the main lens 76 and the first mirror 74 as shown in FIG. 14. At the same time, the feed rollers 406 and the like of the copying machine shown in FIG. 23 are activated by the driving force from the driving gear.

At the same time, the charging device 398 is started to be energized, and corona discharge is generated by the corona wires 408. The copying paper 86 in the shape of a roll is unwound by the action of the feed rollers 406 and transported to the exposing table 84. In the course of this transporation, the copying paper 86 is charged directly below the charging device 398. When the copying paper 86 has been advanced forward a predetermined length, a clutch (not shown) is disengaged to suspend the rotation of the feed rollers 406. At the same time, the leading end portion of the paper 86 is cut in the shape of a sheet by the cutter 396.

Then, the sheet of copying paper 86 which has been charged all over the surface thereof is transported by the endless belts 418 of the exposing table 84 in which the driving shaft 410 is being rotated. When the leading end of the copying paper 86 reaches a predetermined position on the exposing table 84, this is detected by a limit switch (not shown) which is disposed on the exposing table 84, and the drive of the driving gear in the copying machine 12 is suspended. Thus, the copy mirror 88 is stopped in the position shown by the chain line in FIG. 11 (the position shown by the solid line in FIG. 23).

At the same time as the copying paper 86 is stopped on the exposing table 84, the shutter 180 is opened for a predetermined period of time by the action of the automatic exposure controller (not shown), and an image recorded on the electrophotographic film 28 is formed on the first mirror 74 by the main lens 76 and the conversion lens 82. The size of the optical image formed on the first mirror 74 is made slightly smaller than that in the case of the reader mode by the action of the conversion lens 82. The optical image is reflected by the first mirror 74 so as to reach the second mirror 72, and the optical image reflected by the mirror 72 is further reflected by the copy mirror 88 so as to be applied to the copying paper 86 on the exposing table 84. The exposed copying paper 86 has an electrostatic latent image formed thereon.

When the shutter 180 is closed, the driving gear of the copying machine 12 is activated again to rotate the driving shaft 410 of the exposing table 84, so that the exposed copying paper 86 is sent to the developing device 402. In the developing device 402, the paper 86 is advanced into the gap between the toner roller 424 and the feed roller 426 by the action of the feed rollers 420, and the toner attached to the peripheral surface of the toner roller 424 adheres to the exposed surface of the paper 86 to develop the electrostatic latent image.

The developed copying paper 86 is further advanced to the fixing device 404 where it is pressed by the pressure rollers 428 to fix the toner. The copying paper 86 passed through the fixing device 404 reaches the delivery passage 430 where it drops gravitationally, and slides on the slope 432 to reach the paper stacker 434.

Thus, in this embodiment, the central portion of the document 66 is illuminated with direct rays by virtue of the reflecting plates 116 which serve also as shielding plates, and the end portions of the document 66 are illuminated with reflected rays. It is therefore possible to prevent occurrence of any nonuniformity in illuminance regardless of the distance from the illuminating lamps 114. Since the edge of a portion of each reflecting plate 116 which acts as a shielding portion is serrated, no dark region is produced at the boundary between the direct and reflected rays.

Each reflecting plate 116 is stepwise enlarged in width in the direction in which the document 66 becomes more distant from the third mirror 70. Accordingly, the third mirror 70 is uniformly illuminated with the reflected rays from the document 66.

As has been described above, the document illuminating apparatus according to the present invention includes reflecting plates which are varied in the reflecting area along the longitudinal axes of the illuminating lamps in such a manner that the side of each reflecting plate on which the distance between the document and the optical path changing mirror is relatively short has a smaller reflecting area than that of the side of the reflecting plate on which said distance is relatively great. Accordingly, reflected rays from a document which is illuminated with the illuminating lamps can be made incident on the optical path changing mirror at a uniform illuminance, advantageously.

What is claimed is:

1. A document illuminating apparatus wherein a document disposed on a document table is illuminated with an illuminating lamp, and the light reflected from said document is made incident on an optical path changing mirror to change the course of the reflected light, said mirror being disposed in such a manner as to face said document diagonally, said apparatus comprising:

said illuminating lamp having the shape of a rod and disposed at a position intermediate between said document table and said optical path changing mirror in such a manner that said lamp extends along one lateral side of side document table and said optical path changing mirror; and a reflecting plate disposed in such a manner as to extend in the longitudinal direction of said illuminating lamp to reflect the light from said lamp before it is incident on said document, said reflecting plate being varied in reflecting area in the longitudinal direction of said illuminating lamp in such a manner that the side of said reflecting plate on which the distance between said document and said optical path changing mirror is relatively great has a larger reflecting area than that of the side of said reflecting plate on which said distance is relatively short, whereby the illuminance of the reflected light from said document which is incident on said optical path changing mirror is made uniform in the longitudinal direction of said illuminating lamp.

2. A document illuminating apparatus according to claim 1, wherein said reflecting plate has a shielding portion positioned between said illuminating lamp and said document to prevent direct rays from said lamp from being incident on the end portion of said document on the side thereof which is closer to said lamp, and a reflecting portion positioned between said illuminating lamp and said optical path changing mirror to reflect light emitted from said illuminating lamp before said light is incident on said document.

3. A document illuminating apparatus according to claim 2, wherein said reflecting portion is stepwise enlarged in width in the longitudinal diretion thereof so that the area of said reflecting portion is increased as the distance between said optical path changing mirror and said document increases.

4. A document illuminating apparatus according to claim 2, wherein said reflecting portion is tapered in the longitudinal direction thereof so that the area thereof is increased as the distance between said optical path changing mirror and said document increases.

5. A document illuminating apparatus according to claim 3, wherein said shielding portion has an edge thereof serrated in the longitudinal direction thereof.

6. A document illuminating apparatus according to claim 4, wherein said shielding portion has an edge thereof serrated in the longitudinal direction thereof.

7. A document illuminating apparatus according to claim 5, wherein said illuminating lamp and said reflecting plate are supported by a side frame disposed such as to extend along the longitudinal axes of said illuminating lamp and said reflecting plate, so that the light from said illuminating lamp is applied to said document through an opening provided in said side frame, the width of said opening being enlarged in the longitudinal direction of said illuminating lamp as the distance between said document and said optical path changing mirror increases.

8. A document illuminating apparatus according to claim 6, wherein said illuminating lamp and said reflecting plate are supported by a side frame disposed such as to extend along the longitudinal axes of said illuminating lamp and said reflecting plate, so that the light from said illuminating lamp is applied to said document through an opening provided in said side frame, the width of said opening being enlarged in the longitudinal direction of said illuminating lamp as the distance between said document and said optical path changing mirror increases.

9. A document illuminating apparatus wherein a document disposed on a document table is illuminated with a rod-shaped illuminating lamp, and the light reflected from said document is made incident on an optical path changing mirror to change the course of the reflected light, said apparatus comprising:

a transparent planar glass plate disposed at a substantially rectangular opening provided in said dodument table to place said document thereon;

a pair of said illuminating lamps disposed below and on both sides, respectively, of said opening in such a manner that said lamps extend parallel with said opening in the longitudinal direction thereof;

said optical path changing mirror having a planar shape and disposed below said opening in opposing relation to said glass plate, said mirror being inclined with respect to said opening so that the longitudinal prolonged plane of said opening and that of said mirror are parallel to the lateral direction of said opening; and a reflecting plate provided for each of said illuminating lamps in such a manner as to extend parallel with the longitudinal axis of said lamp so as to reflect the light from said lamp before it is incident on said document, said reflecting plate being varied in the reflecting area in the longitudinal direction thereof in such a manner that the side of said reflecting plate on which the distance between said document and said optical path changing mirror is relatively great has a larger reflecting area than that of the side of said reflecting plate on which said distance is relatively short, whereby the illuminance of the reflected light from said document which is incident on said optical path changing mirror is made uniform along the longitudinal axes of said illuminating lamps.

10. A document illuminating apparatus according to claim 9, wherein said reflecting plate has a shielding portion positioned above said illuminating lamp and along one lateral edge of said opening, and a reflecting portion positioned below said shielding portion to reflect the light from said illuminating lamp before it enters said opening.

11. A document illuminating apparatus according to claim 10, wherein said reflecting portion is stepwise enlarged in width in the longitudinal direction thereof so that the area of said reflecting portion is increased as the distance between said optical path changing mirror and said document increases.

12. A document illuminating apparatus according to claim 10, wherein said reflecting portion is tapered in the longitudinal direction thereof so that the area thereof is increased as the distance between said optical path changing mirror and said document increases.

13. A document illuminating apparatus according to claim 11, wherein said shielding portion has an edge thereof serrated in the longitudinal direction thereof.

14. A document illuminating apparatus according to claim 12, wherein said shielding portion has an edge thereof serrated in the longitudinal direction thereof.

15. A document illuminating apparatus according to claim 13, wherein said illuminating lamp and said reflecting plate are supported by a side frame disposed such as to extend along the longitudinal axes of said illuminating lamp and said reflecting plate, so that the light from said illuminating lamp is applied to said document through an opening provided in said side frame, the width of said opening being enlarged in the longitudinal direction of said illuminating lamp as the distance between said document and said optical path changing mirror increases.

16. A document illuminating apparatus according to claim 14, wherein said illuminating lamp and said reflecting plate are supported by a side frame disposed such as to extend along the longitudinal axes of said illuminating lamp and said reflecting plate, so that the light from said illuminating lamp is applied to said document through an opening provided in said side frame, the width of said opening being enlarged in the longitudinal direction of said illuminating lamp as the distance between said document and said optical path changing mirror increases.

17. A document illuminating apparatus according to claim 15, wherein said glass plate is supported at the periphery of the lower surface thereof by a mounting bracket rigidly secured to said side frame, said bracket being so formed that the edge of said bracket on the side thereof where the distance between said opening and said optical path changing mirror is relatively great is extended downward, and the central portion of said edge is extended downward more than both lateral end portions thereof.

18. A document illuminating apparatus according to claim 16, wherein said glass plate is supported at the periphery of the lower surface thereof by a mounting bracket rigidly secured to said side frame, said bracket being so formed that the edge of said bracket on the side thereof where the distance between said opening and said optical path changing mirror is relatively great is extended downward, and the central portion of said edge is extended downward more than both lateral end portions thereof.

* * * * *